United States Patent
Sun et al.

(10) Patent No.: US 10,783,357 B2
(45) Date of Patent: Sep. 22, 2020

(54) APPARATUS AND METHOD FOR RECOGNIZING EXPRESSION OF A FACE, IMAGE PROCESSING APPARATUS AND SYSTEM

(71) Applicant: CANON KABUSHIKI KAISHA, Tokyo (JP)

(72) Inventors: Donghui Sun, Hangzhou (CN); Bo Wu, Beijing (CN); Xian Li, Beijing (CN); Qi Hu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 15/799,316

(22) Filed: Oct. 31, 2017

(65) Prior Publication Data

US 2018/0121716 A1 May 3, 2018

(30) Foreign Application Priority Data

Nov. 2, 2016 (CN) .......................... 2016 1 0951434

(51) Int. Cl.
*G06K 9/00* (2006.01)
*G06T 7/50* (2017.01)
*G06T 7/73* (2017.01)
*G06T 7/90* (2017.01)

(52) U.S. Cl.
CPC ..... *G06K 9/00302* (2013.01); *G06K 9/00248* (2013.01); *G06K 9/00281* (2013.01); *G06T 7/50* (2017.01); *G06T 7/73* (2017.01); *G06T 7/90* (2017.01)

(58) Field of Classification Search
None
See application file for complete search history.

(56) References Cited

PUBLICATIONS

Li, Luning, et al. "An AAM-based face shape classification method used for facial expression recognition." International Journal of Research in Engineering and Technology 2 (2013): 164-168. (Year: 2013).*
Shbib, Reda, and Shikun Zhou. "Facial expression analysis using active shape model." International Journal of Signal Processing, Image Processing and Pattern Recognition 8.1 (2015): 9-22. (Year: 2015).*

(Continued)

*Primary Examiner* — Vu Le
*Assistant Examiner* — Tracy Mangialaschi
(74) *Attorney, Agent, or Firm* — Canon U.S.A., Inc. IP Division

(57) ABSTRACT

One of the aspects of the present disclosure discloses an apparatus for recognizing expression of a face in a face region of an image, comprising: a unit configured to detect feature points of the face in the face region of the image; a unit configured to determine a face shape of the face in the face region based on the detected feature points; a unit configured to determine a group that the face in the face region belongs to based on the determined face shape and pre-defined shape groups; and a unit configured to determine an expression of the face in the face region based on pre-generated first models corresponding to the determined group and features extracted from at least one region in the face region, wherein the at least one of the regions are regions which are labeled out in the pre-generated first models corresponding to the determined group.

20 Claims, 15 Drawing Sheets

(56) References Cited

PUBLICATIONS

Zhang, Shu-Cong, et al. "A face clustering method based on facial shape information." 2011 International Conference on Wavelet Analysis and Pattern Recognition. IEEE, 2011. (Year: 2011).*
Moore, Stephen, and Richard Bowden. "Multi-view pose and facial expression recognition." Proc. BMVC. vol. 2. 2010. (Year: 2010).*
Li, Xiaoli, et al. "Fully automatic 3D facial expression recognition using polytypic multi-block local binary patterns." Signal Processing 108 (2015): 297-308. (Year: 2015).*
Lin Zhong et al; Learning Active Facial Patches for Expression Analysis; Department of computer Science, Rutgers University, Piscataway, NJ 08854; Nanjing University of Information Science and Technology, Nanjing, 210044 China; Department of Computer Science and Engineering, University of Texas at Arlington, Arlington TX 76019; pp. 1-8, (2012).

* cited by examiner

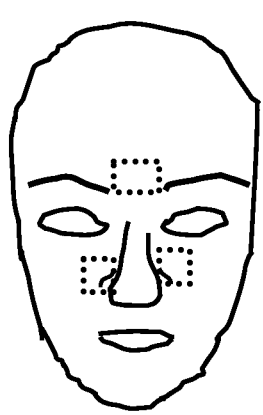
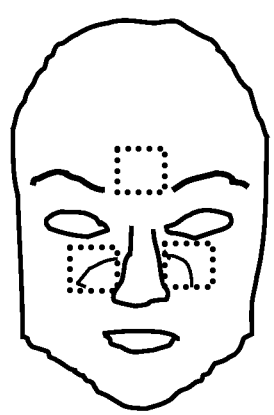
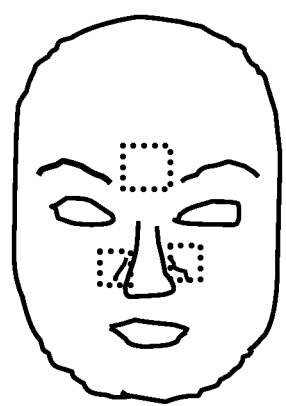
Fig. 1A        Fig. 1B        Fig. 1C
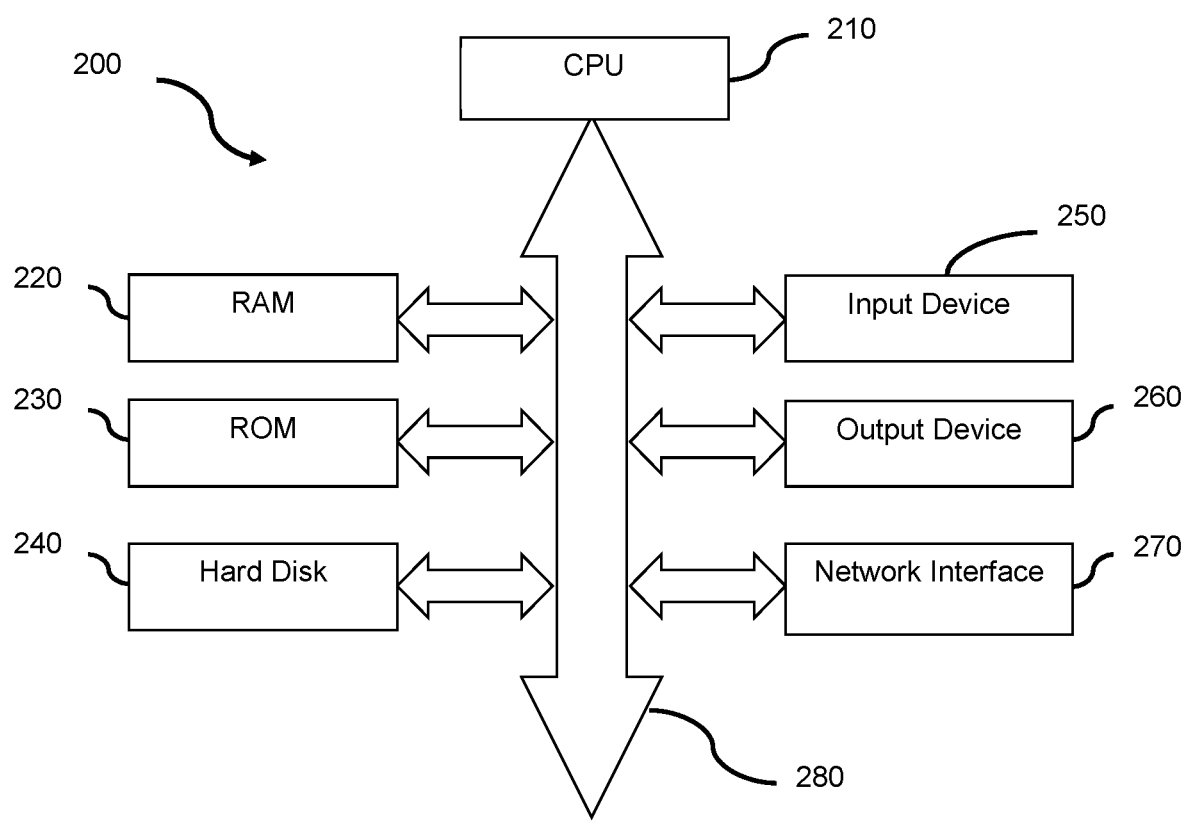
Fig. 2

APPARATUS AND METHOD FOR RECOGNIZING EXPRESSION OF A FACE, IMAGE PROCESSING APPARATUS AND SYSTEM

CROSS-REFERENCE TO RELATED APPLICATIONS

This application is a US Patent application, which claims the benefit of Chinese Patent Application No. 201610951434.9 filed Nov. 2, 2016, of which is hereby incorporated by reference herein in its entirety.

BACKGROUND

Field of the Disclosure

The present disclosure relates to image processing, and particularly relates to, for example, apparatus and method for recognizing expression of a face, image processing apparatus and system.

Description of the Related Art

In traditional facial expression recognition technique, the typical approaches are extracting features from some regions in an image and then recognizing the corresponding facial expression by using these features and pre-generated expression models. In one implementation, the regions from which the features are extracted are regions where the facial expressions are generally occurred. And this kind of regions is generated together with the pre-generated expression models from a plurality of sample images by using learning-based methods. For example, the regions represented by broken lines shown in FIG. 1A are the corresponding regions generated together with the pre-generated expression models.

One typical facial expression recognition method corresponding to the above-mentioned technique is disclosed in "Learning Active Facial Patches for Expression Analysis" (Lin Zhong, Qingshan Liu, Peng Yang, Bo Liu, Junzhou Huang, Dimitris N. Metaxas: Learning active facial patches for expression analysis. CVPR 2012, 2562-2569). And this typical method mainly discloses the following operations: as for one input image, first, detecting feature points of a face in the input image; second, determining a face pose of the face based on the detected feature points; third, determining a pose group that the face belongs to based on the determined face pose; and finally, determining the expression of the face based on the pre-generated expression models corresponding to the determined pose group and extracted features extracted from the regions which are labeled out in the pre-generated expression models corresponding to the determined pose group.

That is to say, in the above-mentioned typical method, as for each group of face poses, the corresponding expression models will be pre-generated, and the corresponding regions where the facial expressions relative to this group of face poses are generally occurred will be labeled out in the corresponding pre-generated expression models. Generally, one expression of one face is occurred through moving several facial muscles of the face. And, as for the faces with different face shapes, the movement ranges of the facial muscles which generate the corresponding expressions will be different. That is to say, as for the faces with different face shapes, the corresponding regions (i.e. locations of the regions and/or sizes of the regions) where the facial expressions are generally occurred will be different. For example, the face shape of the face as shown in FIG. 1A is an "oval" face shape, the face shape of the face as shown in FIG. 1B is a "square" face shape, and the face shape of the face as shown in FIG. 1C is a "round" face shape. Wherein, the regions represented by the broken lines as shown in FIG. 1A to 1C are the regions where the facial expressions are generally occurred. In other words, as for the faces with different face shapes which belong to one group of the face poses, the locations and/or sizes of the regions from which the features used for facial expression recognition are extracted will be different.

However, in the above-mentioned typical method, regardless whether the face shapes of the faces differ or not, as long as the faces belong to the same group of the face poses, the features used for facial expression recognition will be extracted from the same regions in the faces. Therefore, sometimes, the extracted features are unreliable for facial expression recognition, which will cause to decrease the accuracy of the facial expression recognition.

SUMMARY

Therefore, in view of the above recitations in Description of the Related Art, the present disclosure aims to solve the problems as described above.

According to one aspect of the present disclosure, there is provided an apparatus for recognizing expression of a face in a face region of an input image, comprising: a feature point detection unit configured to detect feature points of the face in the face region of the input image; a face shape determination unit configured to determine a face shape of the face in the face region based on the detected feature points; a group determination unit configured to determine a group that the face in the face region belongs to based on the determined face shape and pre-defined shape groups, wherein one of the pre-defined shape groups corresponds to at least one pre-generated first model; and an expression determination unit configured to determine an expression of the face in the face region based on the pre-generated first models corresponding to the determined group and features extracted from at least one region in the face region, wherein the at least one of the regions are regions which are labeled out in the pre-generated first models corresponding to the determined group.

Taking advantage of the present disclosure, the accuracy of the facial expression recognition will be increased.

Further characteristic features and advantages of the present disclosure will be apparent from the following description with reference to the drawings.

BRIEF DESCRIPTION OF THE DRAWINGS

The accompanying drawings, which are incorporated in and constitute apart of the specification, illustrate embodiments of the disclosure and, together with the description, serve to explain the principles of the disclosure.

FIG. 1A to 1C schematically shows exemplary sample images of faces with different face shapes.

FIG. 2 is a block diagram schematically showing the hardware configuration that can implement the techniques according to the embodiments of the present disclosure.

DESCRIPTION OF THE EMBODIMENTS

Figure 3:
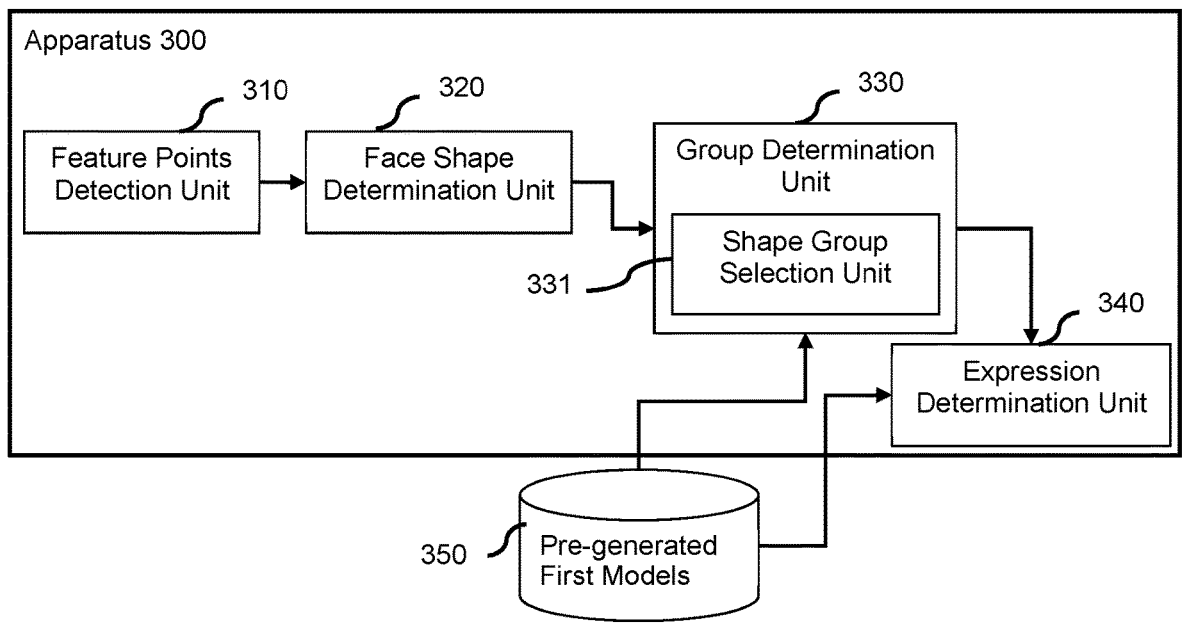
FIG. 3 is a block diagram illustrating the configuration of an apparatus for recognizing expression of a face according to a first embodiment of the present disclosure.

Exemplary embodiments of the present disclosure will be described in detail with reference to the drawings below. It shall be noted that the following description is merely illustrative and exemplary in nature, and is in no way intended to limit the present disclosure and its applications or uses. The relative arrangement of components and steps, numerical expressions and numerical values set forth in the embodiments do not limit the scope of the present disclosure unless it is otherwise specifically stated. In addition, techniques, methods and devices known by persons skilled in the art may not be discussed in detail, but are intended to be a part of the specification where appropriate.

Please note that similar reference numerals and letters refer to similar items in the figures, and thus once an item is defined in one figure, it need not be discussed for following figures.

In the above-mentioned typical method, during the facial expression recognition, the difference among the face shapes will not be taken into consideration. Through the analysis and the experiment, the inventors found that, during the facial expression recognition, in case the difference among the face shapes is taken into consideration, relative to the faces with the different face shapes, the regions from which the features used for the facial expression recognition are extracted will be pre-generated as different regions when pre-generating the corresponding expression models. For example, relative to the faces with the different face shapes, the corresponding regions are the regions with different locations and/or with different sizes. Wherein, hereinafter, this kind of regions is referred as "salient regions" for example. Therefore, as for the faces with the different face shapes, the accuracy of the facial expression recognition will be increased.

In addition, compared with 2-dimensional (2D) images, except the information in the 2D directions (e.g. the information in the coordinates (x, y)), 3-dimensional (3D) images could also provide the information in the 3D directions (e.g. the information in the coordinate (z)). Thus, the accuracy of the face shapes estimated from the 3D images is higher than the accuracy of the face shapes estimated from the 2D images. Therefore, during the facial expression recognition as for the 3D images, since the difference among the face shapes with the higher accuracy could be used, the accuracy of the facial expression recognition could be further increased.

In other words, regardless of the 2D images or the 3D images, relative to the faces with the different face shapes, the "salient regions" will be more accurate. Therefore, the accuracy of the facial expression recognition based on the features extracted from the "salient regions" will be increased.

(Hardware Configuration)

The hardware configuration that can implement the techniques described hereinafter will be described first with reference to FIG. 2. FIG. 2 is a block diagram schematically showing the hardware configuration 200 that can implement the techniques according to the embodiments of the present disclosure.

The hardware configuration 200, for example, includes Central Processing Unit (CPU) 210, Random Access Memory (RAM) 220, Read Only Memory (ROM) 230, Hard Disk 240, Input Device 250, Output Device 260, Network Interface 270 and System. Bus 280. Further, the hardware configuration 200 is implemented by, such as personal data assistant (PDA), mobile phone, laptop, desktop or other suitable electronic device.

Figure 12:
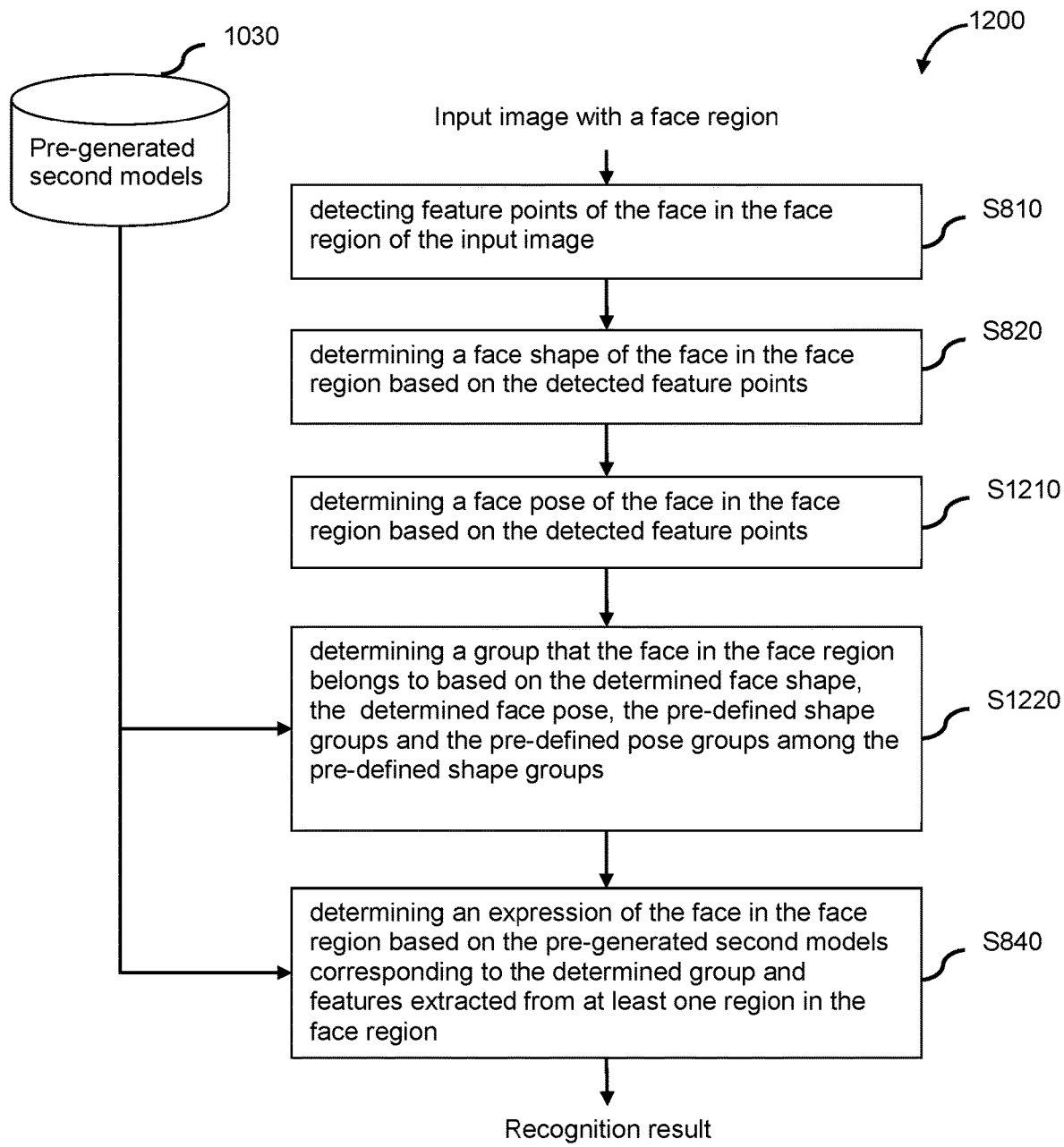
FIG. 12 schematically shows a flowchart for recognition expression of a face according to the second embodiment of the present disclosure.
Figure 13:
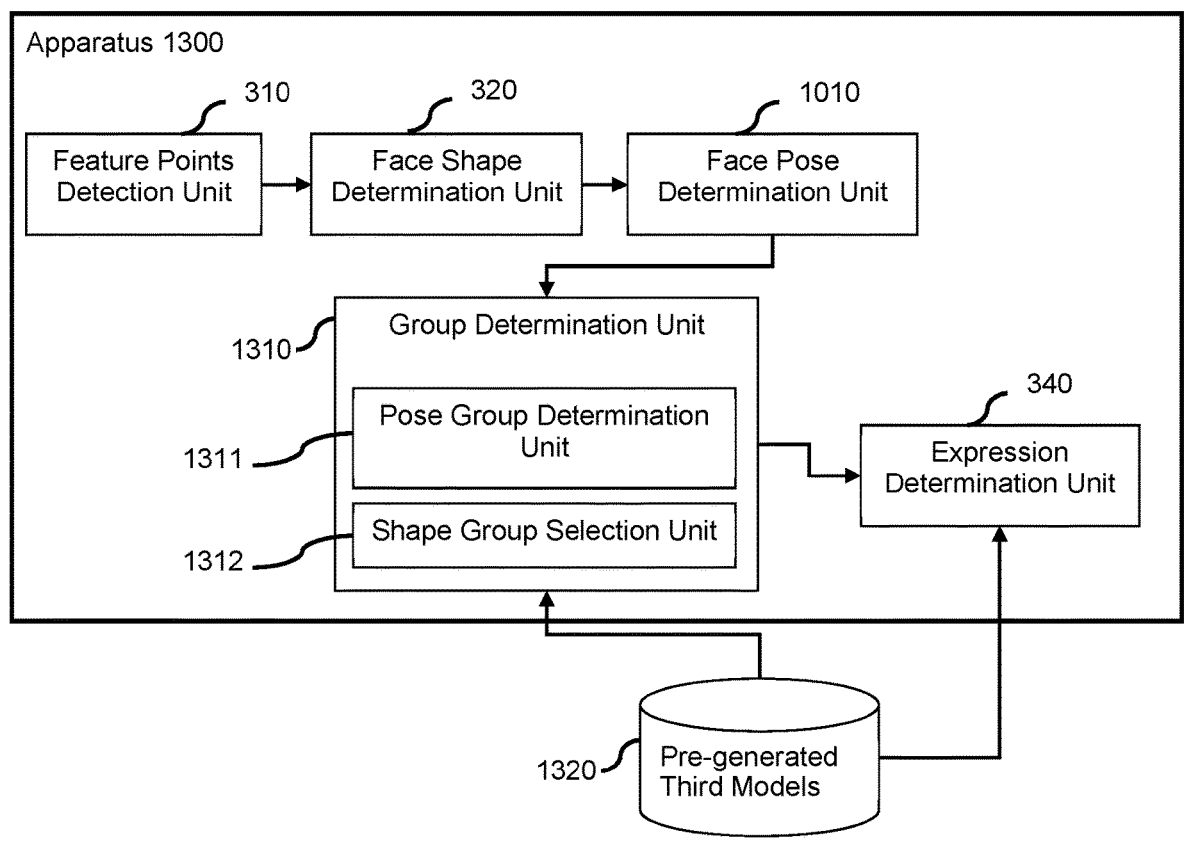
FIG. 13 is a block diagram illustrating the configuration of an apparatus for recognizing expression of a face according to the third embodiment of the present disclosure.
Figure 15:
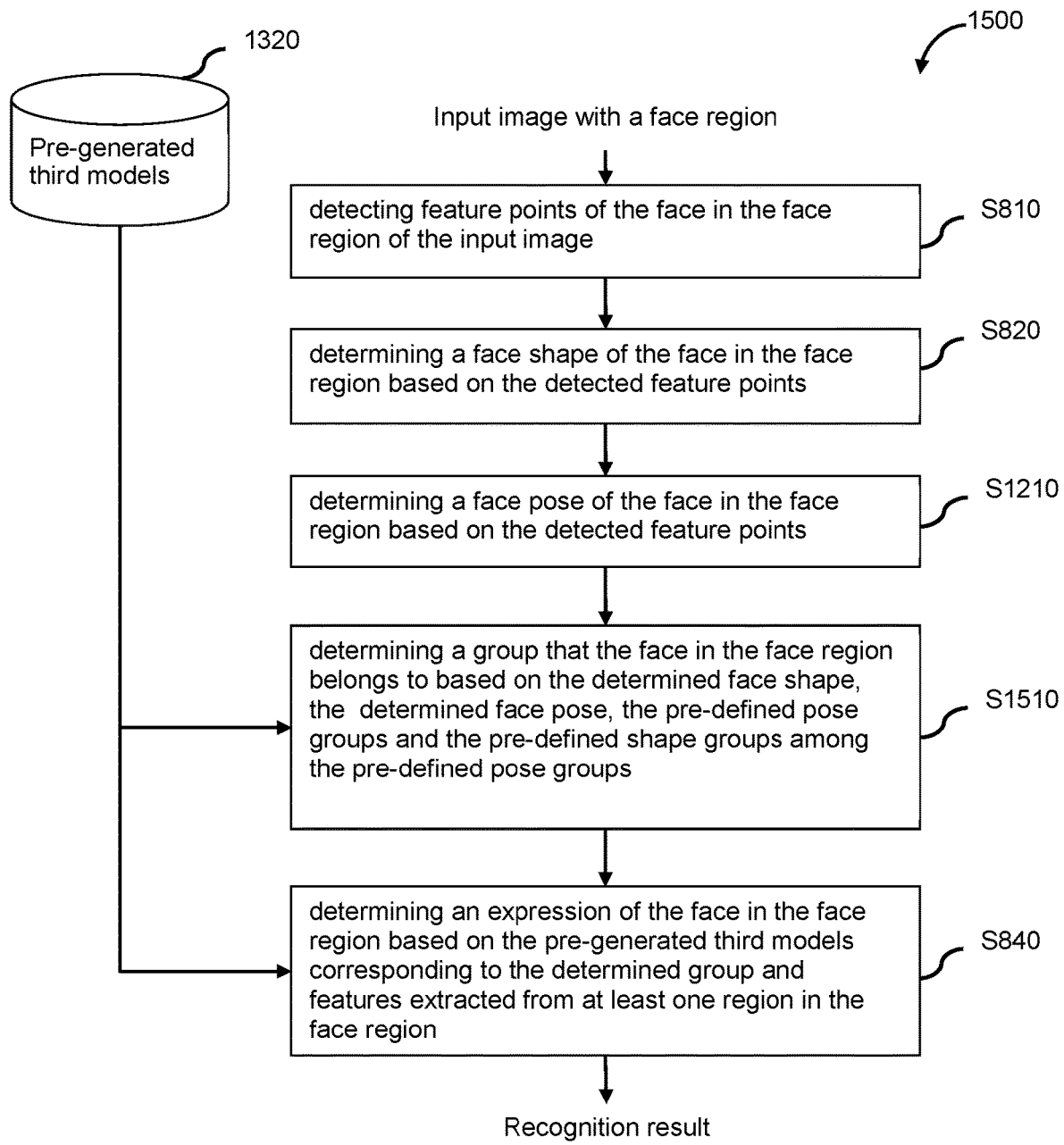
FIG. 15 schematically shows a flowchart for recognition expression of a face according to the third embodiment of the present disclosure.

In one implementation, the facial expression recognition according to the present disclosure is configured by hardware or firmware and is acted as a module or component of the hardware configuration 200. For example, the apparatus 300 which will be described in detail hereinafter by referring to FIG. 3, the apparatus 1000 which will be described in detail hereinafter by referring to FIG. 10 or the apparatus 1300 which will be described in detail hereinafter by referring to FIG. 13 is acted as a module or component of the hardware configuration 200. In another implementation, the facial expression recognition according to the present disclosure is configured by software, stored in the ROM 230 or the Hard Disk 240, and executed by the CPU 210. For example, the procedure 800 which will be described in detail hereinafter by referring to FIG. 8, the procedure 1200 which will be described in detail hereinafter by referring to FIG. 12 or the procedure 1500 which will be described in detail hereinafter by referring to FIG. 15 is acted as a program stored in the ROM 230 or the Hard Disk 240.

The CPU 210 is any suitable programmable control devices (such as processors) and executes a variety of functions, to be described hereinafter, by executing a variety of application programs that are stored in the ROM 230 or the Hard Disk 240 (such as memories). The RAM 220 is used to temporarily store the program or the data that are loaded from the ROM 230 or the Hard Disk 240, and is also used as a space wherein the CPU 210 executes the variety of procedures, such as carrying out the techniques which will be described in detail hereinafter by referring to FIGS. 3-19, as well as other available functions. The Hard Disk 240 stores many kinds of information, such as an operating system (OS), the various applications, a control program, and pre-generated models, wherein the pre-generated models are first models, second models and third models which will be described hereinafter for example.

In one implementation, the Input Device 250 is used to allow the user to interact with the hardware configuration 200. In one instance, the user could input images through the Input Device 250. In another instance, the user could trigger the corresponding facial expression recognition of the present disclosure through the Input Device 250. Furthermore, the Input Device 250 can take a variety of forms, such as a button, a keypad or a touch screen. In another implementation, the Input Device 250 is used to receive images which are output from special electronic devices, such as image acquiring devices.

The Output Device 260 is used to display the recognition results (such as the facial expression recognition results) to the user. And the Output Device 260 can take a variety of forms, such as a Cathode Ray Tube (CRT) or a liquid crystal display.

Figure 21:
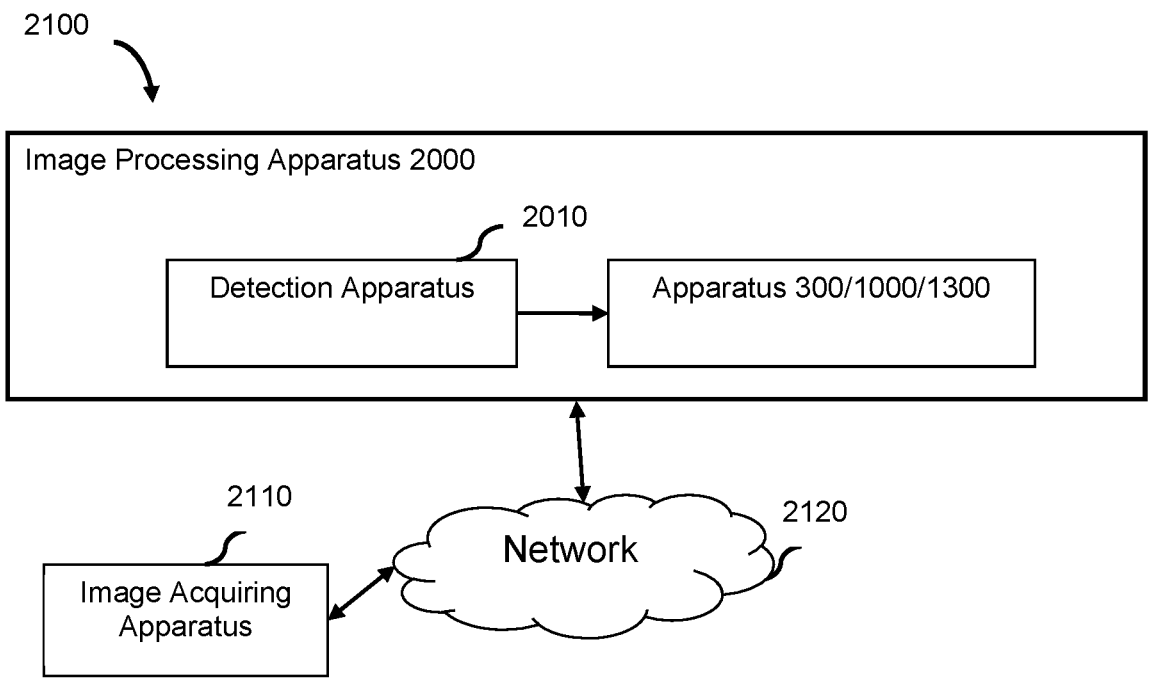
FIG. 21 illustrates the arrangement of an exemplary image processing system according to the present disclosure.

The Network Interface 270 provides an interface for connecting the hardware configuration 200 to the network (such as the network 2120 shown in FIG. 21). For example, the hardware configuration 200 could perform, via the Network Interface 270, data communication with other electronic device (such as the image acquiring apparatus 2110 shown in FIG. 21) connected via the network. Alternatively, a wireless interface may be provided for the hardware configuration 200 to perform wireless data communication. The system bus 280 may provide a data transfer path for transferring data to, from, or between the CPU 210, the RAM 220, the ROM 230, the Hard Disk 240, the Input Device 250, the Output Device 260 and the Network Interface 270, and the like to each other. Although referred to as a bus, the system bus 280 is not limited to any specific data transfer technology.

The above described hardware configuration 200 is merely illustrative and is in no way intended to limit the disclosure, its application, or uses. And for the sake of simplicity, only one hardware configuration is shown in FIG. 2. However, a plurality of hardware configurations can also be used as needed.

(Facial Expression Recognition)

The configuration for facial expression recognition will be described next with reference to FIG. 3 to FIG. 15.

FIG. 3 is a block diagram illustrating the configuration of an apparatus 300 for recognizing expression of a face according to the first embodiment of the present disclosure. Wherein, some or all of the blocks shown in FIG. 3 could be implemented by dedicated hardware.

As shown in FIG. 3, the apparatus 300 according to the first embodiment of the present disclosure comprises: a feature point detection unit 310, a face shape determination unit 320, a group determination unit 330 and an expression determination unit 340.

In addition, a storage device 350 shown in FIG. 3 stores pre-generated first models which will be described hereinafter, wherein the corresponding "salient regions" are labeled out in the pre-generated first models. In one implementation, the storage device 350 is the ROM 230 or the Hard Disk 240 shown in FIG. 2. Alternatively, the storage device 350 is a sever or an external storage device connected with the apparatus 300 via the system bus or the network (not shown).

First, the Input Device 250 shown in FIG. 2 acquires an image which is output from the special electronic device (such as an image acquiring apparatus) or is input by the user. As described above, the acquired image could be the 2D image and/or the 3D image. In this embodiment, the 3D image will be taken as an example, and the acquired 3D image is a 3D face image with a face region. Second, the Input Device 250 transfers the acquired 3D image to the feature point detection unit 310 via the system bus 280.

As shown in FIG. 3, the feature point detection unit 310 acquires the acquired 3D image from the Input Device 250 through the system bus 280 and detect feature points of the face (i.e. 3D facial feature points) in the face region of the acquired 3D image (i.e. the input 3D image). Wherein, at the present disclosure, the number of the feature points is not fixed. Generally, the more feature points are detected, the more accurate face shape can be determined.

In addition, the feature points could be detected from the face region of the input 3D image by using the existing methods for detecting the feature points from 3D images. For example, at the present disclosure, the feature point detection unit 310 detects the feature points of the face by using the method disclosed in "A novel facial feature point localization method on 3D face" (Peng Guan, Yaoliang Yu, and Liming Zhang Int. Conf. on Image Processing, ICIP, 2007).

And then, the face shape determination unit 320 determines a face shape of the face in the face region based on the detected feature points. In one implementation, the face shape determination unit 320 determines a feature vector which is obtained by linking 3D coordinates of the detected feature points as the corresponding face shape. For example, in case the feature point detection unit 310 detects N feature points, the corresponding feature vector is represented as $F(x_1, y_1, z_1, \ldots, x_N, y_N, z_N)$. In another implementation, the face shape determination unit 320 determines the face shape based on the detected feature points and pre-generated shape models. For example, the pre-generated shape models are regression models.

As described above, except the information in the 2D directions (e.g. the information in the coordinates (x, y)), the feature points detected from the 3D images also provide the information in the 3D directions (e.g. the information in the coordinate (z)). Thus, the face shape determined based on these feature points is more accurate. In addition, at the present disclosure, the determined face shape is represented by the above-mentioned feature vector for example.

After the face shape is determined, the group determination unit 330 determines a group that the face in the face region belongs to based on the determined face shape and pre-defined shape groups, wherein the pre-defined shape groups correspond to at least one pre-generated first model stored in the storage device 350. In other words, in this first embodiment, the determined group is a shape group that the face shape of the face in the face region belongs to. Wherein, the pre-generated first models and the corresponding pre-defined shape groups are obtained by using the generating method which will be described in detail hereinafter by referring to FIG. 16. As described above, the face shapes of the different faces could be the "oval" face shape, the "square" face shape, the "round" face shape and so on. Thus, the pre-defined shape groups could be an "oval" shape group, a "square" shape group, a "round" shape group and so on. Taking the "oval" shape group for example, the corresponding pre-generated first models comprise at least one of the following models, such as, a model for recognizing "anger" expression, a model for recognizing "joy" expression, a model for recognizing "fear" expression, and so on.

In one implementation, as shown in FIG. 3, the group determination unit 330 comprises a shape group selection unit 331. More specifically, after the face shape determination unit 320 determines the corresponding face shape, the shape group selection unit 331 selects one of the pre-defined shape groups as the determined group based on distances among the determined face shape and centers of the pre-defined shape groups.

Figure 4:
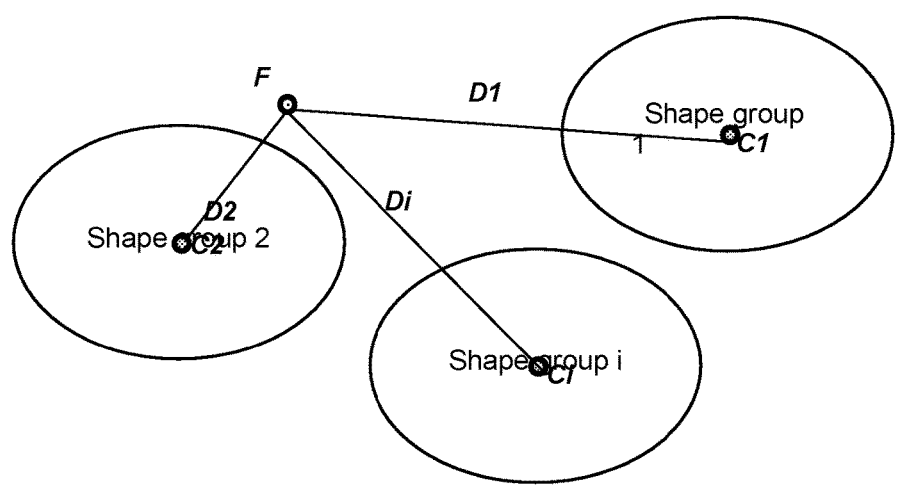
FIG. 4 schematically shows exemplary distances among a face shape represented by a feature vector and centers of pre-generated shape groups according to the present disclosure.

For example, as shown in FIG. 4, the point "F" represents the feature vector of the determined face shape. The shape group 1, the shape group 2, . . . , the shape group i represent the pre-defined shape groups. The point "C1" represents the center of the shape group 1, the point "C2" represents the center of the shape group 2, and the point "Ci" represents the center of the shape group i. Wherein, a center of a pre-defined shape group will be determined when generating the corresponding pre-generated first models, which will be described in detail hereinafter by referring to FIG. 16. The line segment "D1", the line segment "D2", . . . , the line segment "Di" represent the distances between the corresponding two points.

As for the feature vector "F", the shape group selection unit 331 first calculates the corresponding distances between the feature vector "F" and each center (i.e. "C1", "C2", . . . , "Ci"), and then selects the pre-defined shape group the distance between whose center and the feature vector "F" is minimum as the determined group. As shown in FIG. 4, the distance between the feature vector "F" and the point "C2" is minimum, thus, the shape group 2 will be selected as the determined group. In other words, the face whose face shape represented by the feature vector "F" is determined to belong to the shape group 2.

After the group determination unit 330 determines the corresponding group (i.e. the corresponding shape group), the expression determination unit 340 determines an expression of the face in the face region based on the pre-generated first models corresponding to the determined group which are stored in the storage device 350 and features extracted from at least one region in the face region. Wherein the at least one of the regions are regions which are labeled out in the pre-generated first models corresponding to the determined group. In other words, the regions from which the features used for the facial expression recognition are extracted are namely the above-mentioned "salient regions". As described above, these "salient regions" will be pre-generated when generating the corresponding pre-generated first models, which will be described in detail hereinafter by referring to FIG. 16.

More specifically, firstly, the expression determination unit 340 extracts the corresponding features from each "salient region".

Figure 5:
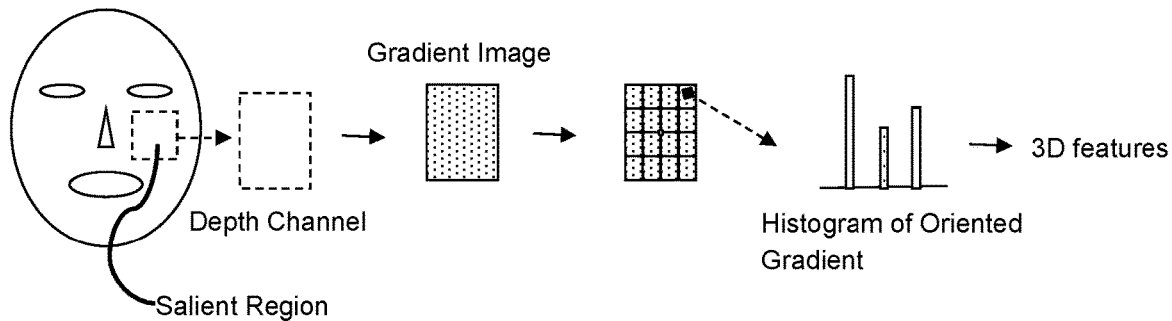
FIG. 5 schematically shows an exemplary processing of the expression determination unit 340 shown in FIG. 3 for extracting depth features from one region according to the present disclosure.

In one implementation, as for each "salient region", the extracted features are depth features of the face in the acquired 3D image. Wherein, the depth features are namely 3D features of the face and are extracted from the depth channel of the face in the acquired 3D image. FIG. 5 schematically shows an exemplary processing of the expression determination unit 340 shown in FIG. 3 for extracting the depth features from one salient region according to the present disclosure. In this exemplary processing, the gradient features will be extracted as the depth features.

As for the salient region shown in FIG. 5, firstly, the expression determination unit 340 determines the corresponding gradient image from the depth channel of this salient region. Secondly, the expression determination unit 340 divides the gradient image into several blocks with the same size, wherein, the number of the divided blocks and the size of the divided blocks are not fixed. As shown in FIG. 5, in this exemplary processing, the number of the divided blocks is 16 for example. And then, the expression determination unit 340 calculates the corresponding gradient features from each divided block to obtain the corresponding depth features of this salient region. For example, the expression determination unit 340 calculates the Histogram of Oriented Gradients (HOG) feature from each divided block, and then links all of the HOG features as the corresponding depth features of this salient region. Wherein, for example, the HOG features of each divided block could be calculated by using the existing methods, such as the method disclosed in "Histograms of Oriented Gradients for Human Detection" (Dalal N, Triggs B. Histograms of oriented gradients for human detection, IEEE Conference on Computer Vision & Pattern Recognition. 2013:886-893). Alternatively, instead of the HOG features, other kinds of features could also be calculated to obtain the corresponding gradient features of this salient region, such as the Local Binary Pattern (LBP) features, the Scale Invariant Feature Transform (SIFT) features. In addition, instead of the gradient features, other kinds of features could also be extracted as the corresponding depth features of this salient region, such as texture features.

Figure 6:
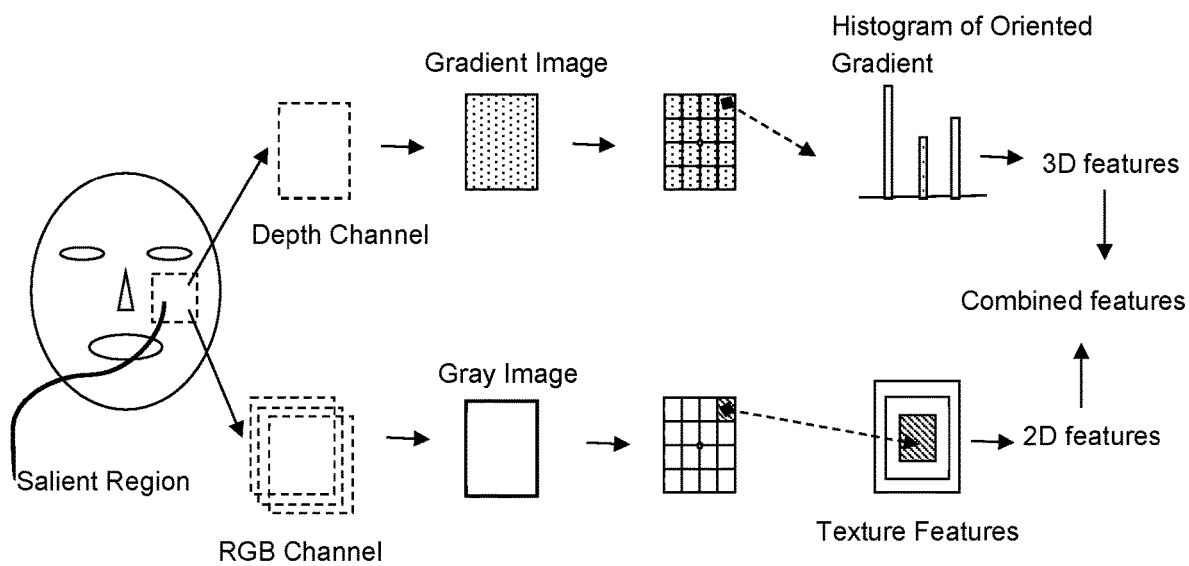
FIG. 6 schematically shows an exemplary processing of the expression determination unit 340 shown in FIG. 3 for extracting depth features and color features from one region according to the present disclosure.

In addition, except the 3D features, the faces in the 3D images also include the 2D features. Therefore, in order to increase the accuracy of the facial expression recognition, except the 3D features (i.e. the above-mentioned depth features), the 2D features of the face could also be used for the facial expression recognition. In another implementation, as for each "salient region", the extracted features are the depth features and color features of the face in the acquired 3D image. Wherein, the color features are namely 2D features of the face and are extracted from the RGB channel of the face in the acquired 3D image. FIG. 6 schematically shows an exemplary processing of the expression determination unit 340 shown in FIG. 3 for extracting the depth features and the color features from one salient region according to the present disclosure. In this exemplary processing, the gradient features will be extracted as the depth features, and the texture features will be extracted as the color features.

As for the salient region shown in FIG. 6, firstly, the expression determination unit 340 extracts the gradient features and the texture features from this salient region respectively. And then, the expression determination unit 340 combines the gradient features and the text features as the corresponding features of this salient region.

As for the gradient features, since the corresponding processing is the same as the processing as described in FIG. 5, the detailed description would not be repeated herein. As for the color features, firstly, the expression determination unit 340 converts the RGB channel of this salient region into a gray image, wherein this gray image has the same size as the RGB channel. Secondly, the expression determination unit 340 divides the gray image into several blocks with the same size, wherein, the number of the divided blocks and the size of the divided blocks are not fixed. As shown in FIG. 6, in this exemplary processing, the number of the divided blocks is 16 for example. And then, the expression determination unit 340 extracts the corresponding texture features from each divided block to obtain the corresponding color features of this salient region. For example, the expression determination unit 340 extracts the LBP features from each divided block, and then links all of the LBP features as the corresponding color features of this salient region. Wherein, for example, the LBP features of each divided block could be extracted by using the existing methods, such as the method disclosed in "Face Recognition with Local Binary Patterns" (Ahonen T, Hadid A, Pietikainen M. Face Recognition with Local Binary Patterns, Computer Vision—ECCV 2004, European Conference on Computer Vision, Prague, Czech Republic, May 11-14, 2004. Proceedings. 2014:469-481). Alternatively, instead of the LBP features, other kinds of features could also be extracted to obtain the corresponding texture features of this salient region, such as the HOG features, the SIFT features. In addition, instead of the texture features, other kinds of features could also be extracted as the corresponding color features of this salient region, such as color histogram.

Figure 7:
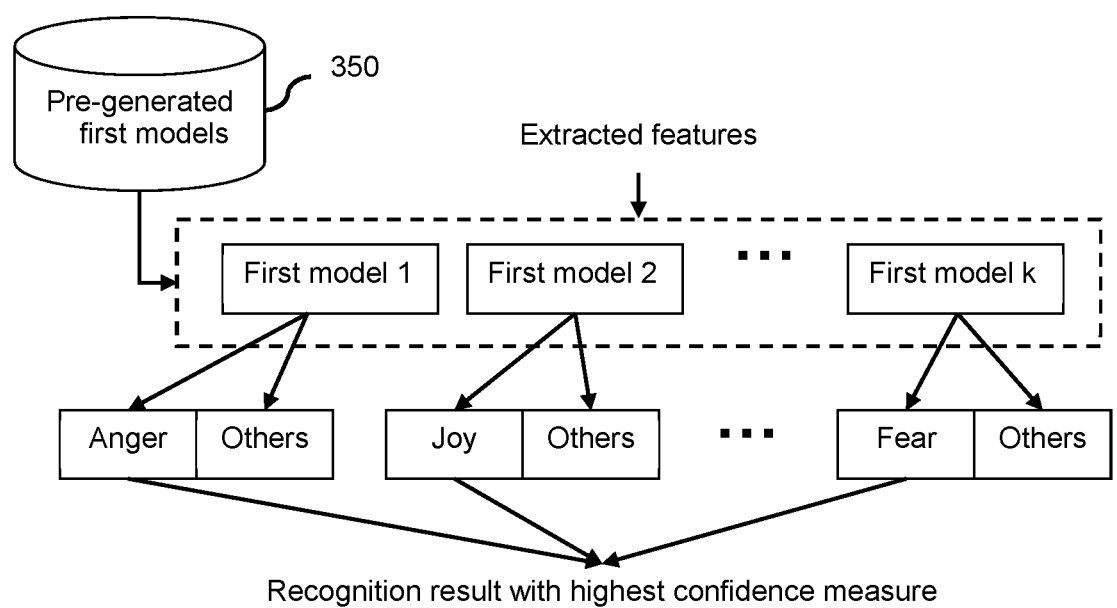
FIG. 7 schematically shows an exemplary processing of the expression determination unit 340 shown in FIG. 3 for determining the expression of the face according to the present disclosure.

And then, after the expression determination unit 340 extracts the corresponding features from each "salient region", the expression determination unit 340 determines the expression of the face in the face region based on the pre-generated first models corresponding to the determined group and the extracted features. As described above, one pre-defined shape group corresponds to at least one pre-generated first models, and the corresponding pre-generated first models comprise at least one of the following models, such as, a model for recognizing "anger" expression, a model for recognizing "joy" expression, a model for recognizing "fear" expression, and so on. That is to say, the determined group corresponds to at least one pre-generated first models, and each pre-generated first model could be a binary classifier, wherein, one binary classifier could judge what the expression of a face is, for example, the "joy" expression or the other expressions. Taking the determined group corresponding to k pre-generated first models for example, FIG. 7 schematically shows an exemplary processing of the expression determination unit 340 shown in FIG. 3 for determining the expression of the face. Wherein, the first model 1 to the first model k shown in FIG. 7 are the pre-generated first models which correspond to the determined group and are stored in the storage device 350 shown in FIG. 3.

As shown in FIG. 7, firstly, based on the extracted features and each first model, the expression determination unit 340 obtains one corresponding recognition result with a confidence measure. Taking the first model 1 for example, the corresponding recognition result is the "anger" expression with the corresponding confidence measure. And then, the expression determination unit 340 determines the recognition result with the highest confidence measure as the expression of the face.

Finally, after the expression determination unit 340 determines the expression of the face in the acquired 3D image, the expression determination unit 340 transfer the recognition result (i.e. the determined expression) to the Output Device 260 shown in FIG. 2 via the system bus 280 for displaying the recognition result to the user.

Figure 8:
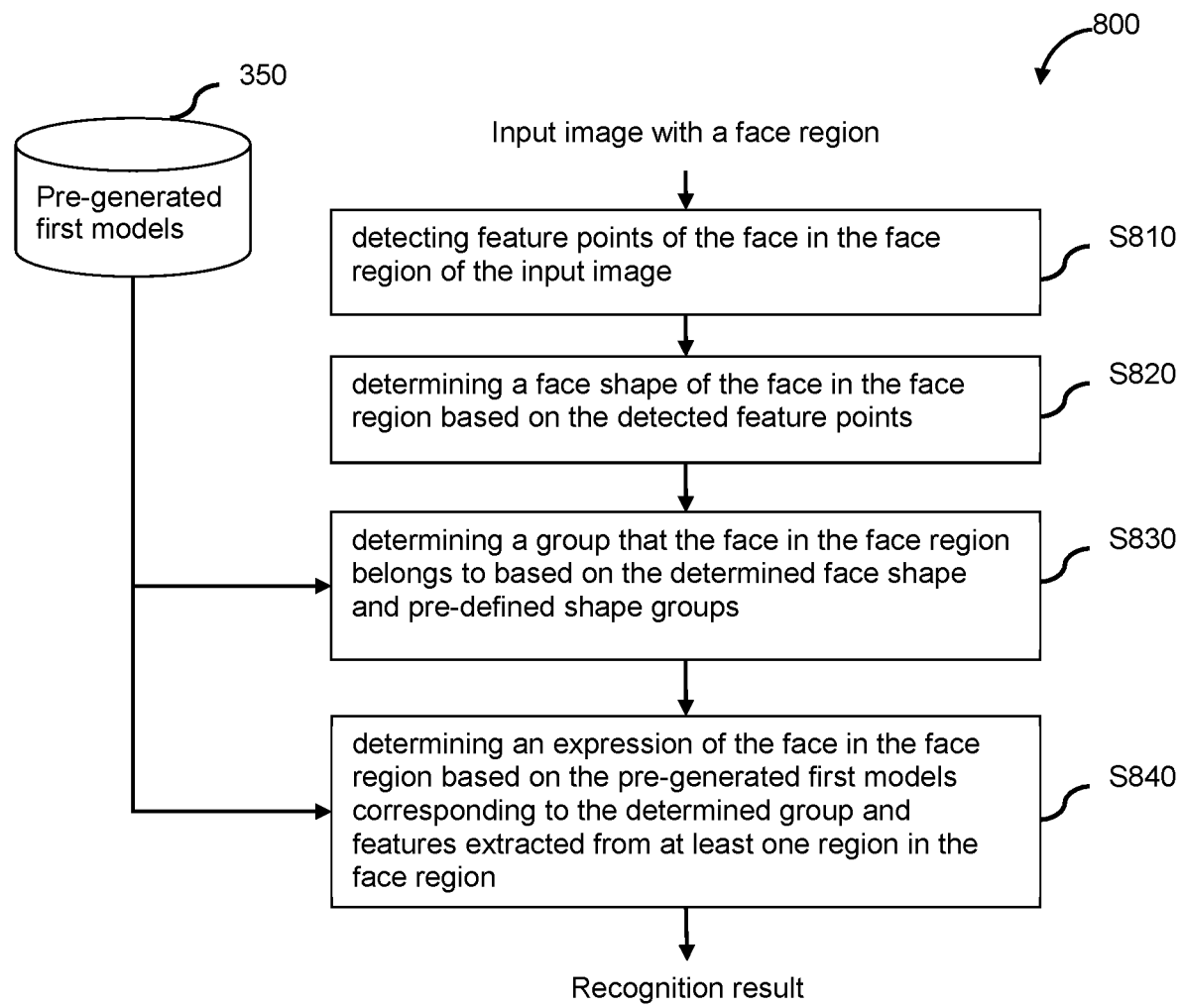
FIG. 8 schematically shows a flowchart for recognition expression of a face according to the first embodiment of the present disclosure.

Next, the overall processing executed by the configuration of the apparatus 300 shown in FIG. 3 will be described with reference to FIG. 8. FIG. 8 schematically shows a flowchart 800 for recognition expression of a face according to the first embodiment of the present disclosure.

As described above, first, the Input Device 250 shown in FIG. 2 acquires an image which is output from the electronic device (such as the image acquiring apparatus) or is input by the user. In this embodiment, the 3D image will be taken as an example and the acquired 3D image is a 3D face image with a face region. Second, the Input Device 250 transfers the acquired 3D image to the feature point detection unit 310 via the system bus 280.

And then, as shown in FIG. 8, in feature points detection step S810, the feature point detection unit 310 acquires the acquired 3D image from the Input Device 250 through the system bus 280 and detect feature points of the face (i.e. 3D facial feature points) in the face region of the acquired 3D image (i.e. the input 3D image).

In face shape determination step S820, the face shape determination unit 320 determines a face shape of the face in the face region based on the detected feature points. For example, a feature vector which is obtained by linking 3D coordinates of the detected feature points is determined as the corresponding face shape.

In group determination step S830, the group determination unit 330 determines a group that the face in the face region belongs to based on the determined face shape and pre-defined shape groups, wherein the pre-defined shape groups correspond to at least one pre-generated first model stored in the storage device 350. In this first embodiment, the determined group is a shape group that the face shape of the face in the face region belongs to.

In expression determination step S840, the expression determination unit 340 determines an expression of the face in the face region based on the pre-generated first models corresponding to the determined group which are stored in the storage device 350 and features extracted from at least one region in the face region. Wherein the at least one of the regions are regions which are labeled out in the pre-generated first models corresponding to the determined group.

In the above-mentioned first embodiment of the present disclosure, when generating the pre-generated first models and when recognizing the expression of the face in the images, the face shapes of the different faces are taken into consideration. Thus, relative to the faces with the different face shapes, the "salient regions" from which the features used for recognizing the expression of the face are extracted will be more accurate. Furthermore, as described above, except the information in the 2D directions, the 3D images could also provide the information in the 3D directions. Thus, the face shapes estimated from the 3D images are more accurate. Therefore, the "salient regions" from which the features used for recognizing the expression of the face are extracted will be even more accurate. Therefore, the accuracy of the facial expression recognition according to the first embodiment will be increased.

Figure 9:
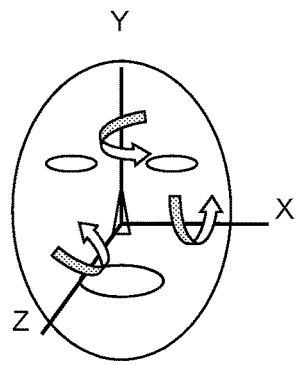
FIG. 9 schematically shows an exemplary face in 3-dimensional directions.

Considering that, except the face shapes of the different faces will affect the accuracy of the above-mentioned "salient regions", the face poses of the different faces will also affect the accuracy of the above-mentioned "salient regions". In order to further increase the accuracy of the facial expression recognition, the facial expression recognition which takes into consideration both the face shapes of the different faces and the face poses of the different faces will be described hereinafter. Wherein, a face pose of a face is represented by rotation angles of the face relative to coordinates. Taking a 3D image for example, a face pose of a face is represented by rotation angles of the face relative to 3D directions. For example, the face pose of the face shown in FIG. 9 is represented by a Yaw angle, a Pitch angle and a Roll angle. Wherein, the Yaw angle is the rotation angle of the face relative to the x coordinate of the 3D directions, the Pitch angle is the rotation angle of the face relative to the y coordinate of the 3D directions, and the Roll angle is the rotation angle of the face relative to the z coordinate of the 3D directions.

Figure 10:
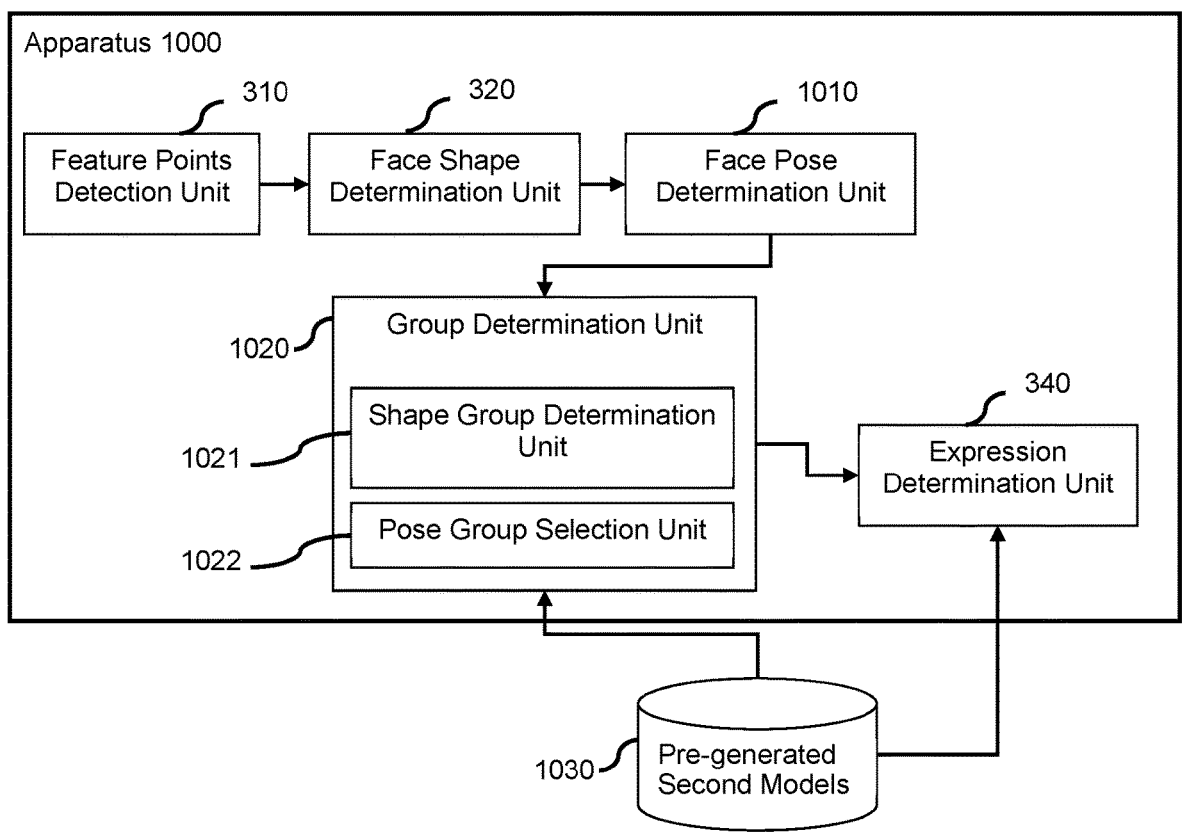
FIG. 10 is a block diagram illustrating the configuration of an apparatus for recognizing expression of a face according to the second embodiment of the present disclosure.

FIG. 10 is a block diagram illustrating the configuration of an apparatus 1000 for recognizing expression of a face according to the second embodiment of the present disclosure. Wherein, some or all of the blocks shown in FIG. 10 could be implemented by dedicated hardware.

In this second embodiment, the 3D image also will be taken as an example. Comparing FIG. 10 with FIG. 3, the main differences of the apparatus 1000 shown in FIG. 10 are as following:

First, the apparatus 1000 further comprises a face pose determination unit 1010.

Second, except the face shape of the face, the group determination unit 1020 also takes the face pose of the face into consideration when determining the group that the face in the face region of the acquired 3D image belongs to.

Third, except the face shapes of the different faces, the face poses of the different faces are also taken into consideration when generating the pre-generated second models which are stored in a storage device 1030.

More specifically, as shown in FIG. 10, after the feature point detection unit 310 detects the feature points of the face in the face region of the acquired 3D image (i.e. the input 3D image), and after the face shape determination unit 320 determines the face shape of the face in the face region, the face pose determination unit 1010 determines a face pose of the face in the face region based on the detected feature points. Wherein, the face pose could be determined by using the existing methods for determining the face poses in 3D images. For example, at the present disclosure, the face pose determination unit 1010 determines the face pose by using the method disclosed in "3D Face Pose Estimation Based on Face Feature Points and Linear Regression" (Qiu L M. 3D Face Pose Estimation Based on Face Feature Points and Linear Regression[J]. Journal of Sanming University, 2008).

And then, the group determination unit 1020 determines the group that the face in the face region belongs to based on the determined face shape, the determined face pose, the pre-defined shape groups and pre-defined pose groups among the pre-defined shape groups, wherein the pre-defined pose groups in the pre-defined shape groups correspond to at least one pre-generated second model stored in the storage device 1030, and the pre-defined pose groups represent angle ranges of rotation angles of faces in the pre-defined pose groups relative to 3D directions. In other words, in this second embodiment, the determined group is a pose group in a shape group that both the face shape of the face and the face pose of the face in the face region belongs to. Wherein, the pre-generated second models, the corresponding pre-defined shape groups, the corresponding pre-defined pose groups are obtained by using the generating method which will be described in detail hereinafter by referring to FIG. 18.

Figure 11:
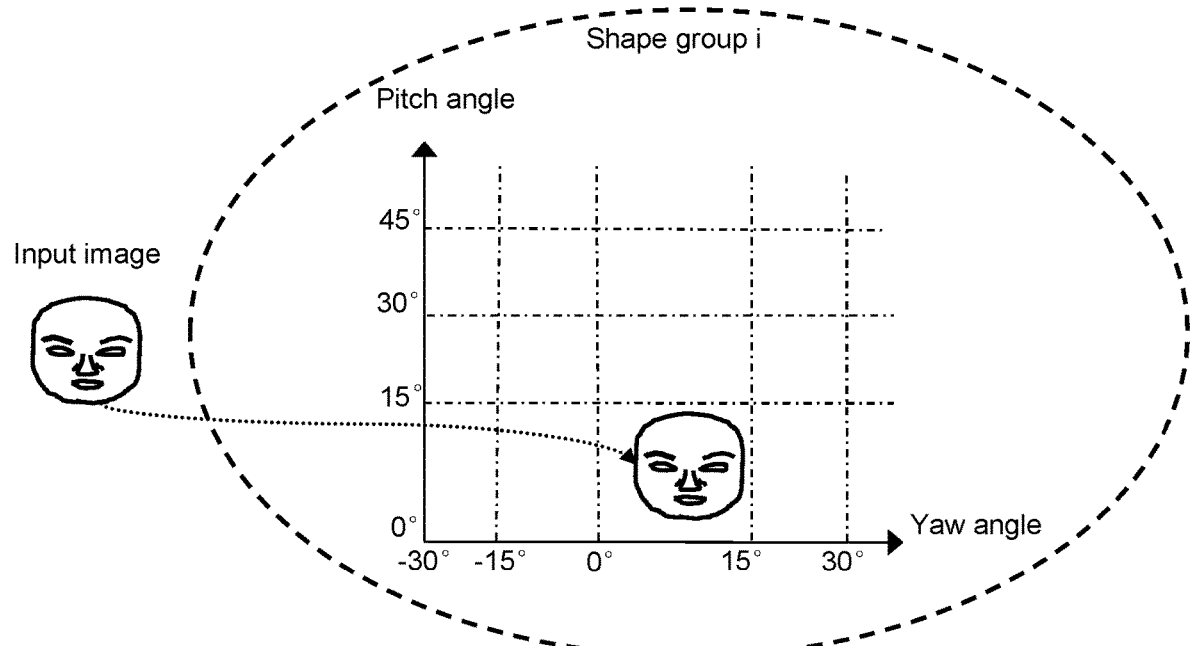
FIG. 11 schematically shows exemplary pre-defined pose groups in one pre-defined shape group.

As described above, the face poses of the different faces will affect the accuracy of the above-mentioned "salient regions", and the face pose of the face could be represented by the Yaw angle, the Pitch angle and the Roll angle. Therefore, one pre-defined pose group could be represented by an angle range of the Yaw angle, an angle range of the Pitch angle and an angle range of the Roll angle. In addition, as for the accuracy of the above-mentioned "salient regions", the effect of the Roll angle of the face could be eliminated by image rotation processing, therefore, the pre-defined pose groups are generally represented by the angle range of the Yaw angle and the angle range of the Pitch angle. FIG. 11 schematically shows exemplary pre-defined pose groups in one pre-defined shape group (e.g. the shape group i). As shown in FIG. 11, each rectangle region represents one pre-defined pose group. Taking the pose group the angle range of whose Yaw angle is (0°, 15°) and the angle range of whose Pitch angel is (0°, 15°) in the shape group i for example, the corresponding pre-generated second models also comprise at least one of the following models, such as, a model for recognizing "anger" expression, a model for recognizing "joy" expression, a model for recognizing "fear" expression, and so on.

In one implementation, as shown in FIG. 10, the group determination unit 1020 comprises a shape group determination unit 1021 and a pose group selection unit 1022. More specifically, first, the shape group determination unit 1021 determines one of the pre-defined shape groups based on distances among the face shape determined by the face shape determination unit 320 and centers of the pre-defined shape groups. Wherein, the processing of the shape group determination unit 1021 is similar to the processing of the shape group selection unit 331 as described in FIG. 3, thus, the detailed description would not be repeated herein. And then, the pose group selection unit 1022 selects one of the pre-defined pose groups in the determined pre-defined shape group as the determined group by comparing the determined face pose with angle ranges of the pre-defined pose groups in the determined pre-defined shape group.

Taking the input image shown in FIG. 11 for example, assuming that the face pose determination unit 1010 determines that the Yaw angle of the face pose of the face in the input image is 5° and the Pitch angle of the face pose of the face in the input image is 0°, and assuming that the shape group determination unit 1021 determines that the face shape of the face in the input image belongs to the pre-defined shape group i, since both the Yaw angle of the face and the Pitch angle of the face fall into the angle range (0°, 15°), the pose group selection unit 1022 will select the pre-defined pose group the angle range of whose Yaw angle is (0°, 15°) and the angle range of whose Pitch angel is (0°, 15°) as the determined group.

After the group determination unit 1020 determines the corresponding group (i.e. a pose group in a shape group), the expression determination unit 340 determines the expression of the face in the face region based on the pre-generated second models corresponding to the determined group which are stored in the storage device 1030 and features extracted from at least one region in the face region. Wherein the at least one of the regions are regions which are labeled out in the pre-generated second models corresponding to the determined group. In other words, the regions from which the features used for the facial expression recognition are extracted are namely the above-mentioned "salient regions". And, these "salient regions" also will be pre-generated when generating the corresponding pre-generated second models, which will be described in detail hereinafter by referring to FIG. 18.

In addition, since the feature point detection unit 310, the face shape determination unit 320 and the expression determination unit 340 shown in FIG. 10 are the same as the feature point detection unit 310, the face shape determination unit 320 and the expression determination unit 340 shown in FIG. 3, the detailed description would not be repeated herein.

Next, the overall processing executed by the configuration of the apparatus 1000 shown in FIG. 10 will be described with reference to FIG. 12. FIG. 12 schematically shows a flowchart 1200 for recognition expression of a face according to the second embodiment of the present disclosure.

Comparing FIG. 12 with FIG. 8, the main differences of the flowchart 1200 shown in FIG. 12 are as following, wherein the 3D image also will be taken as an example:

First, the flowchart 1200 further comprises a face pose determination step S1210.

Second, except the face shape of the face, the group determination step S1220 also takes the face pose of the face into consideration when determining the group that the face in the face region of the acquired 3D image belongs to.

Third, except the face shapes of the different faces, the face poses of the different faces are also taken into consideration when generating the pre-generated second models which are stored in a storage device 1030.

More specifically, as shown in FIG. 12, after the face shape determination unit 320 determines the face shape of the face in the face region of the acquired 3D image (i.e. the input 3D image) in the face shape determination step S820, in the face pose determination step S1210, the face pose determination unit 1010 determines a face pose of the face in the face region based on the detected feature points.

In the group determination step S1220, the group determination unit 1020 determines the group that the face in the face region belongs to based on the determined face shape, the determined face pose, the pre-defined shape groups and pre-defined pose groups among the pre-defined shape groups, wherein the pre-defined pose groups in the pre-defined shape groups correspond to at least one pre-generated second model stored in the storage device 1030, and the pre-defined pose groups represent angle ranges of rotation angles of faces in the pre-defined pose groups relative to 3D directions. In this second embodiment, the determined group is a pose group in a shape group that both the face shape of the face and the face pose of the face in the face region belongs to.

And then, in the expression determination step S840, the expression determination unit 340 determines the expression of the face in the face region based on the pre-generated second models corresponding to the determined group which are stored in the storage device 1030 and features extracted from at least one region in the face region. Wherein the at least one of the regions are regions which are labeled out in the pre-generated second models corresponding to the determined group.

In addition, since the steps S810-S820 and S840 shown in FIG. 12 are the same as the steps S810-S820 and S840 shown in FIG. 8, the detailed description would not be repeated herein.

In the above-mentioned second embodiment of the present disclosure, during the group determination processing, a shape group that the face shape of the face belongs to will be determined first, and then a pose group that the face pose of the face belongs to will be determined among the determined shape group. Alternatively, during the group determination processing, a pose group that the face pose of the face belongs to could be determined first, and then a shape group that the face shape of the face belongs to could be determined among the determined pose group. FIG. 13 is a block diagram illustrating the configuration of an apparatus 1300 for recognizing expression of a face according to the third embodiment of the present disclosure. Wherein, some or all of the blocks shown in FIG. 13 could be implemented by dedicated hardware.

In this third embodiment, the 3D image also will be taken as an example. Comparing FIG. 13 with FIG. 10, the main differences of the apparatus 1300 shown in FIG. 13 are the processing of a group determination unit 1310 and the pre-generated third models stored in a storage device 1320.

More specifically, as shown in FIG. 13, after the face shape determination unit 320 determines the face shape of the face in the face region of the acquired 3D image (i.e. the input 3D image), and after the face pose determination unit 1010 determines the face pose of the face in the face region, the group determination unit 1310 determines a group that the face in the face region belongs to based on the determined face shape, the determined face pose, pre-defined pose groups and pre-defined shape groups among the pre-defined pose groups, wherein the pre-defined shape groups in the pre-defined pose groups correspond to at least one pre-generated third model stored in the storage device 1320, and the pre-defined pose groups represent angle ranges of rotation angles of faces in the pre-defined pose groups relative to 3D directions. In other words, in this third embodiment, the determined group is a shape group in a pose group that both the face shape of the face and the face pose of the face in the face region belongs to. Wherein, the pre-generated third models, the corresponding pre-defined shape groups, the corresponding pre-defined pose groups are obtained by using the generating method which will be described in detail hereinafter by referring to FIG. 19.

Figure 14:
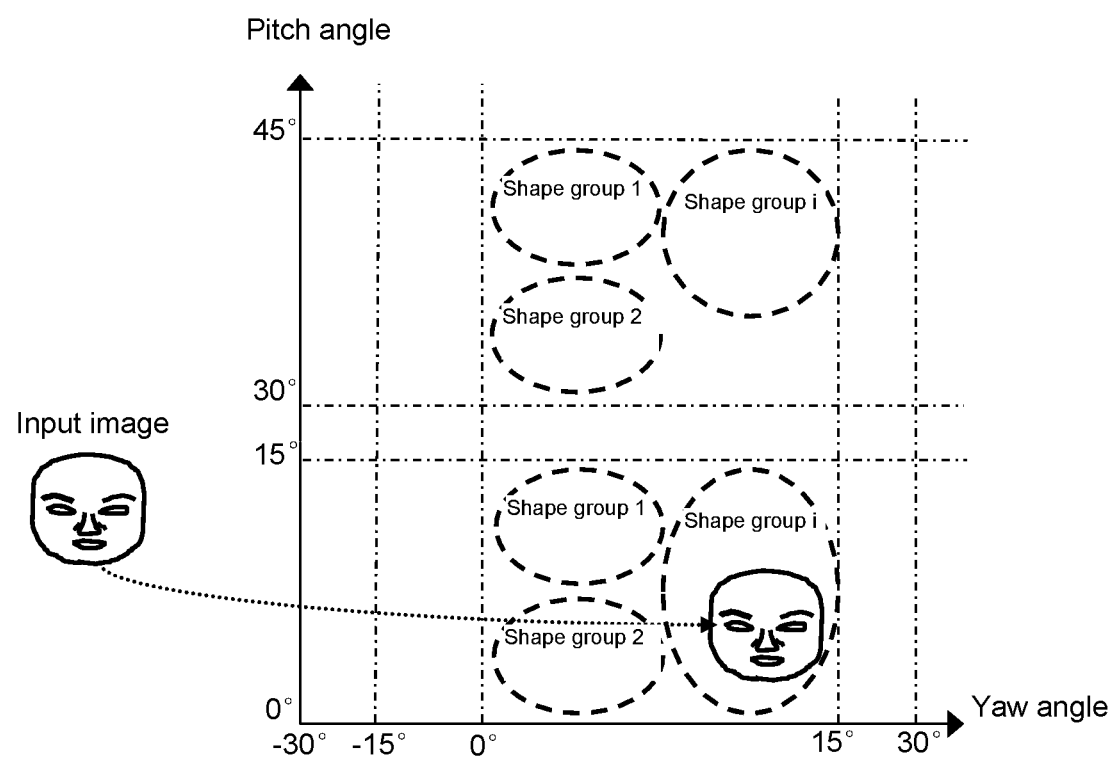
FIG. 14 schematically shows exemplary pre-defined shape groups in one pre-defined pose group.

As described above, as for the 3D image, the pre-defined pose groups are generally represented by the angle range of the Yaw angle and the angle range of the Pitch angle. FIG. 14 schematically shows exemplary pre-defined shape groups in one pre-defined pose group. Taking the pre-defined pose group the angle range of whose Yaw angle is (0°, 15°) and the angle range of whose Pitch angel is (0°, 15°) shown in FIG. 14 for example, each ellipse region represents one pre-defined shape group in this pre-defined pose group.

In one implementation, as shown in FIG. 13, the group determination unit 1310 comprises a pose group determination unit 1311 and a shape group selection unit 1312. More specifically, first, the pose group determination unit 1311 determine one of the pre-defined pose groups by comparing the determined face pose with angle ranges of the pre-defined pose groups. And then, the shape group selection unit 1312 selects one of the pre-defined shape groups in the determined pre-defined pose group as the determined group based on distances among the determined face shape and centers of the pre-defined shape groups in the determined pre-defined pose group. Wherein, the processing of the shape group selection unit 1312 is similar to the processing of the shape group selection unit 331 as described in FIG. 3, thus, the detailed description would not be repeated herein.

Taking the input image shown in FIG. 14 for example, assuming that the face pose determination unit 1010 determines that the Yaw angle of the face pose of the face in the input image is 5° and the Pitch angle of the face pose of the face in the input image is 0°, the pose group determination unit 1311 will determine that the face pose of the face in the input image belongs to the pre-defined pose group the angle range of whose Yaw angle is (0°, 15°) and the angle range of whose Pitch angel is (0°, 15°). And assuming that the face shape of the face in the input image belongs to the pre-defined shape group i, the shape group selection unit 1312 will select the pre-defined shape group i in the determined pre-defined pose group as the determined group.

After the group determination unit 1310 determines the corresponding group (i.e. a shape group in a pose group), the expression determination unit 340 determines the expression of the face in the face region based on the pre-generated third models corresponding to the determined group which are stored in the storage device 1320 and features extracted from at least one region in the face region. Wherein the at least one of the regions are regions which are labeled out in the pre-generated third models corresponding to the determined group. In other words, the regions from which the features used for the facial expression recognition are extracted are namely the above-mentioned "salient regions". And, these "salient regions" also will be pre-generated when generating the corresponding pre-generated third models, which will be described in detail hereinafter by referring to FIG. 19.

In addition, since the feature point detection unit 310, the face shape determination unit 320, the face pose determination unit 1010 and the expression determination unit 340 shown in FIG. 13 are the same as the feature point detection unit 310, the face shape determination unit 320, the face pose determination unit 1010 and the expression determination unit 340 shown in FIG. 10, the detailed description would not be repeated herein.

Next, the overall processing executed by the configuration of the apparatus 1300 shown in FIG. 13 will be described with reference to FIG. 15. FIG. 15 schematically shows a flowchart 1500 for recognition expression of a face according to the third embodiment of the present disclosure.

Comparing FIG. 15 with FIG. 12, the main differences of the flowchart 1500 shown in FIG. 15 are the processing of a group determination step S1510 and the pre-generated third models stored in the storage device 1320. Wherein, the 3D image also will be taken as an example.

More specifically, as shown in FIG. 15, after the face shape determination unit 320 determines the face shape of the face in the face region of the acquired 3D image (i.e. the input 3D image) in the face shape determination step S820, and after the face pose determination unit 1010 determines the face pose of the face in the face region in the face pose determination step S1210, in the group determination step S1510, the group determination unit 1310 determines a group that the face in the face region belongs to based on the determined face shape, the determined face pose, pre-defined pose groups and pre-defined shape groups among the pre-defined pose groups, wherein the pre-defined shape groups in the pre-defined pose groups correspond to at least one pre-generated third model stored in the storage device 1320, and the pre-defined pose groups represents angle ranges of rotation angles of faces in the pre-defined pose groups relative to 3D directions. In other words, in this third embodiment, the determined group is a shape group in a pose group that both the face shape of the face and the face pose of the face in the face region belongs to.

And then, in the expression determination step S840, the expression determination unit 340 determines the expression of the face in the face region based on the pre-generated third models corresponding to the determined group which are stored in the storage device 1320 and features extracted from at least one region in the face region. Wherein the at least one of the regions are regions which are labeled out in the pre-generated third models corresponding to the determined group.

In addition, since the steps S810-S820, S840 and S1210 shown in FIG. 15 are the same as the steps S810-S820, S840 and S1210 shown in FIG. 12, the detailed description would not be repeated herein.

In the above-mentioned second and third embodiments of the present disclosure, when generating the pre-generated second/third models and when recognizing the expression of the face in the images, both the face shapes of the different faces and the face poses of the different faces are taken into consideration. Thus, relative to the faces with the different face shapes and with different face poses, the "salient regions" from which the features used for recognizing the expression of the face are extracted will be more accurate. Furthermore, as described above, except the information in the 2D directions, the 3D images could also provide the information in the 3D directions. Thus, the face shapes estimated from the 3D images are more accurate. Therefore, the "salient regions" from which the features used for recognizing the expression of the face are extracted will be even more accurate. Therefore, the accuracy of the facial expression recognition according to the second and third embodiments will be further increased.

(First/Second/Third Models Generation)

Figure 16:
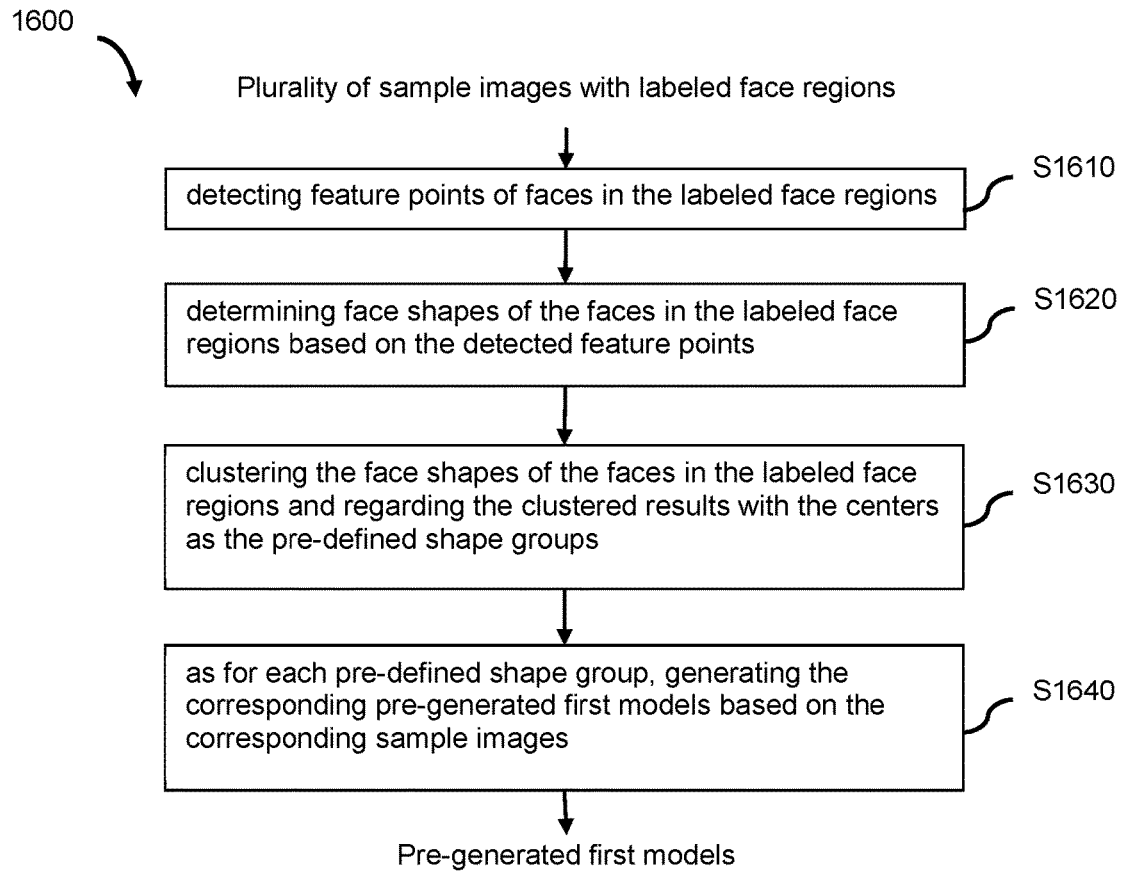
FIG. 16 is a flowchart schematically showing a generating method for generating the first models which could be used in the present disclosure.

In the above-mentioned first embodiment of the present disclosure, the face shapes of the different faces are taken into consideration. In order to generate the corresponding first models that could be used in the present disclosure, the first models could be generated from a plurality of sample images by using the generating method with reference to FIG. 16 in advance. FIG. 16 is a flowchart 1600 schematically showing a generating method for generating the first models which could be used in the present disclosure. The generating method with reference to FIG. 16 also could be executed by the hardware configuration 200 shown in FIG. 2.

As shown in FIG. 16, first, the CPU 210 as shown in FIG. 2 acquires a plurality of sample images input by the manufacture through the Input Device 250. Wherein, based on the experience or prior knowledge, the face region in each sample image is labeled out. Hereinafter, the 3D sample images will be taken as an example.

And then, in step S1610, the CPU 210 detects feature points of faces in the face regions labeled out in the plurality of 3D sample images. As described above, the feature points also could be detected from the labeled face regions by using the existing methods for detecting the feature points from 3D images.

In step S1620, the CPU 210 determines face shapes of the faces in the labeled face regions based on the detected feature points. As described above, as for one face in one labeled face region, a feature vector which is obtained by linking 3D coordinates of the corresponding detected feature points could be determined as the corresponding face shape. In addition, the corresponding face shape also could be determined based on the corresponding detected feature points and the pre-generated shape models.

In step S1630, the CPU 210 clusters the face shapes of the faces in the labeled face regions by using the existing clustering methods, such as the K-means method, the FCM (Fuzzy C-Means) method and so on. Wherein, during the clustering processing, as for each clustered result, a corresponding center will be automatically generated for this clustered result. And the clustered results with the corresponding centers are regarded as the pre-defined shape groups.

In step S1640, as for each pre-defined shape group, the CPU 210 generates the corresponding pre-generated first models based on the corresponding 3D sample images, wherein the face shapes of the faces in the labeled face regions of these 3D sample images belong to this pre-defined shape group. Wherein, each pre-generated first model includes at least one classifier with a labeled region, and the classifiers are generated based on features extracted from the corresponding labeled region among the corresponding 3D sample images.

Figure 17:
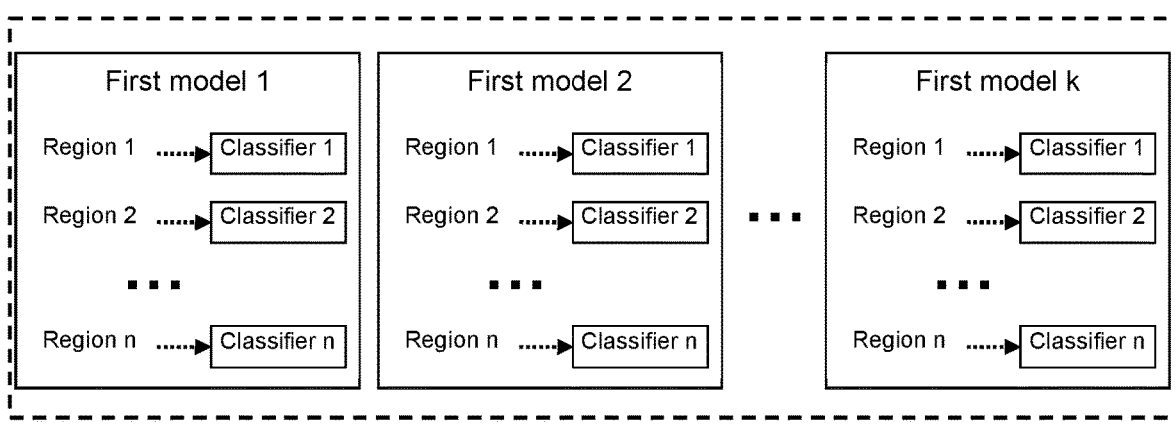
FIG. 17 schematically shows an exemplary structure of the pre-generated first models corresponding to one pre-defined shape group according to the present disclosure.

As described above, each pre-defined shape group corresponds to at least one pre-generated first models and each pre-generated first model could recognize a specified expression (such as "anger" expression). FIG. 17 schematically shows an exemplary structure of the pre-generated first models corresponding to one pre-defined shape group. As shown in FIG. 17, this pre-defined shape group corresponds to k pre-generated first models, and each pre-generated first model includes n classifier with a labeled region. That is to say, each pre-generated first model is an ensemble of the corresponding n classifiers. In addition, it will be understood by those skilled in the art that the above-mentioned exemplary structure is merely illustrative but not limiting. For example, each pre-generated first model could include different number of classifiers.

In one implementation, as for one pre-generated first model, at least one of the classifiers of this pre-generated first model is generated by the existing boosting methods, for example, the method disclosed in "Real Time Facial Expression Recognition with AdaBoost" (Y. Wang, H. Ai, B. Wu and C. Huang, "Real Time Facial Expression Recognition with AdaBoost", Proc. 17th Int'l Conf. Pattern Recognition, 2004).

More specifically, first, the CPU 210 weights the corresponding 3D sample images. For example, in case this pre-generated first model is a model for recognizing "anger" expression, the corresponding 3D sample images are 3D sample images relative to the "anger" expression. In addition, the weighting factor for each 3D sample image could be set based on the experience or prior knowledge.

Second, the CPU 210 obtains at least one candidate region from each weighted 3D sample image. For example, the candidate regions are obtained by using image scanning methods, wherein the main concept of the image scanning methods is scanning each 3D sample image with a scanning window of a predetermined size and moving the scanning window with a predetermined step width from the original point of the 3D sample image.

And then, as for the candidate regions with the same position among the weighted 3D sample images, the CPU 210 generates a candidate classifier with a classification error based on features extracted from these candidate regions. Wherein, the classification error represents a ratio of the number of the wrong classification results to the number of the 3D sample images. In addition, each candidate classifier is generated by using the existing machine learning methods, such as the Support Vector Machine (SVM). And, as described above, the extracted features are depth features (i.e. 3D features) of the face and/or color features (i.e. 2D features) of the face for example.

Finally, the CPU 210 selects the candidate classifier with the minimum classification error as one classifier of this pre-generated first model. Wherein, a region whose position corresponds to the position of the candidate regions used to generate this classifier is regarded as the labeled region (i.e. the above-mentioned "salient region") of this classifier.

In the above-mentioned second and third embodiments of the present disclosure, both the face shapes of the different faces and the face poses of the different faces are taken into consideration. In order to generate the corresponding second and third models that could be used in the present disclosure, the second models could be generated from a plurality of sample images by using the generating method with reference to FIG. 18 in advance, and the third models could be generated from a plurality of sample images by using the generating method with reference to FIG. 19 in advance.

Figure 18:
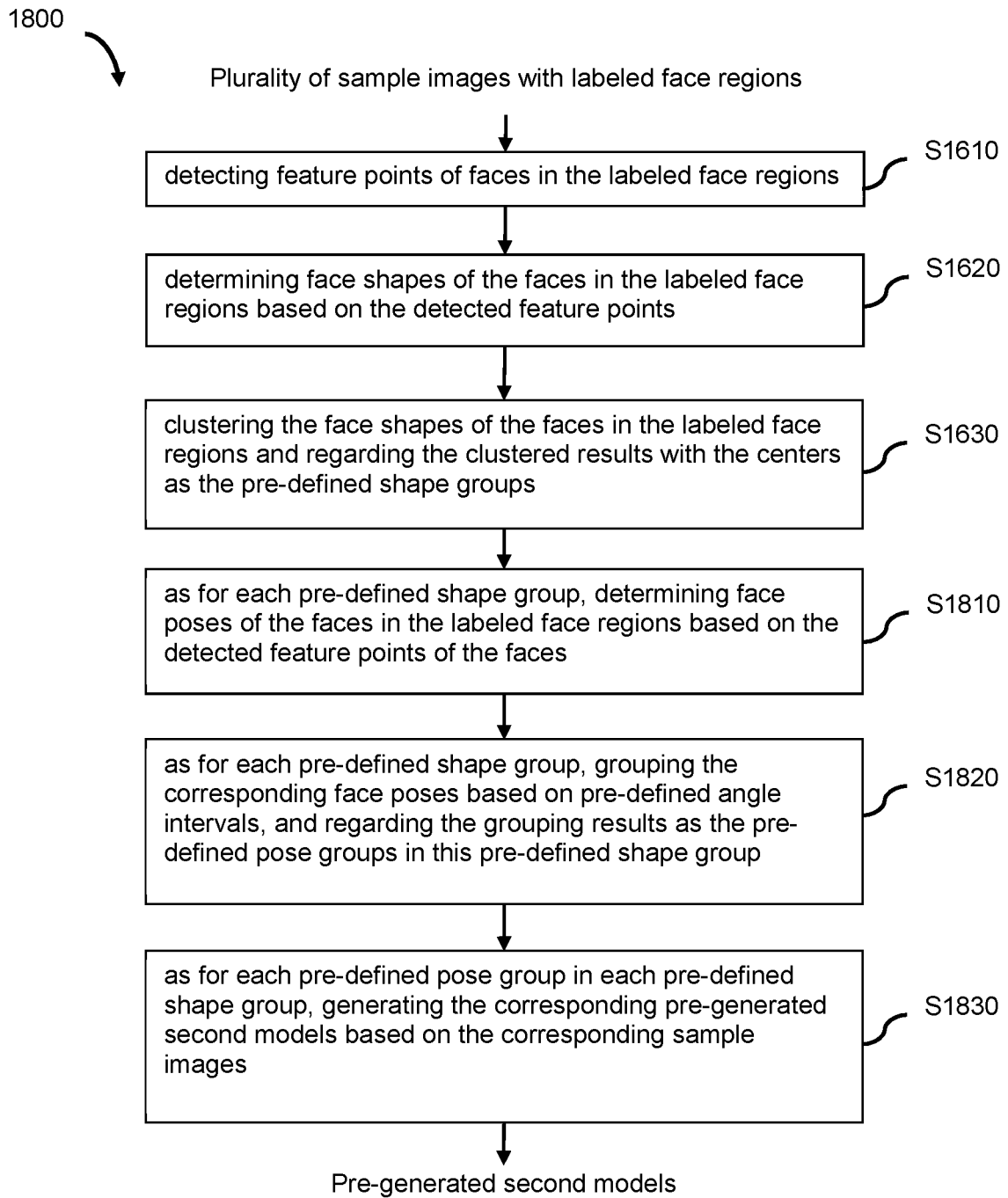
FIG. 18 is a flowchart schematically showing a generating method for generating the second models which could be used in the present disclosure.

FIG. 18 is a flowchart 1800 schematically showing a generating method for generating the second models which could be used in the present disclosure. The generating method with reference to FIG. 18 also could be executed by the hardware configuration 200 shown in FIG. 2. Hereinafter, the 3D sample images also will be taken as an example.

Comparing FIG. 18 with FIG. 16, after the CPU 210 obtains the pre-defined shape groups in the step S1630, in step S1810, as for each pre-defined shape group, the CPU 210 determines face poses of the faces in the labeled face regions based on the detected feature points of the faces whose face shapes in the labeled face regions are clustered into this pre-defined shape group. As described above, the corresponding face pose also could be determined by using the existing methods for determining the face poses in 3D images.

In step S1820, as for each pre-defined shape group, the CPU 210 groups the corresponding face poses of the faces in the labeled face regions based on pre-defined angle intervals for the rotation angles of the faces relative to 3D directions, and regarding the grouping results as the pre-defined pose groups in this pre-defined shape group. As described above, one pre-defined pose group could be represented by the angle range of the Yaw angle, the angle range of the Pitch angle and the angle range of the Roll angle. Taking the angle interval for each rotation angle is 15° for example, an exemplary pre-defined pose group could be the group the angle range of whose Yaw angle is (0°, 15°), the angle range of whose Pitch angel is (0°, 15°) and the angle range of whose Roll angle is (0°, 15°).

And then, in step S1830, as for each pre-defined pose group in each pre-defined shape group, the CPU 210 generates the corresponding pre-generated second models based on the corresponding 3D sample images, wherein the face shapes of the faces in the labeled face regions of these 3D sample images belong to this pre-defined shape group and the face poses of the faces in the labeled face regions of these 3D sample images belong to this pre-defined pose group. Wherein, each pre-generated second model includes at least one classifier with a labeled region (i.e. the above-mentioned "salient region"), and the classifiers are generated based on features extracted from the corresponding labeled region among the corresponding 3-dimensional sample images.

Since the steps S1610-S1630 shown in FIG. 18 are the same as the steps S1610-S1630 shown in FIG. 16, and the processing of the step S1830 shown in FIG. 18 is the same as the processing of the step S1640 shown in FIG. 16, the detailed description would not be repeated herein.

Figure 19:
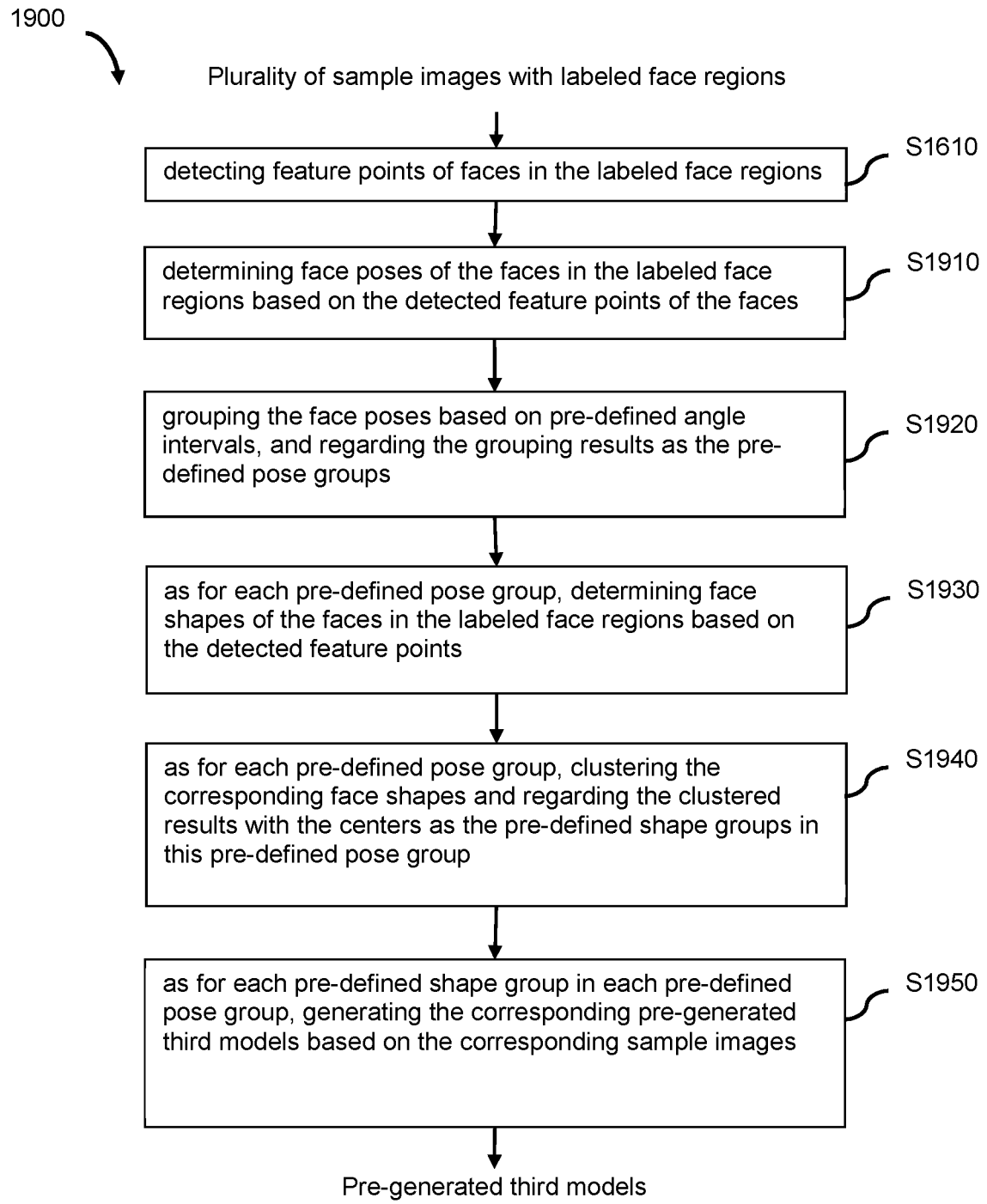
FIG. 19 is a flowchart schematically showing a generating method for generating the third models which could be used in the present disclosure.

FIG. 19 is a flowchart 1900 schematically showing a generating method for generating the third models which could be used in the present disclosure. The generating method with reference to FIG. 19 also could be executed by the hardware configuration 200 shown in FIG. 2. Hereinafter, the 3D sample images also will be taken as an example.

Comparing FIG. 19 with FIG. 18, the main difference of the flowchart 1900 shown in FIG. 19 is that determining the pose groups first and then determining the corresponding shape groups in each pose group, instead of determining the shape groups first and determining the corresponding pose groups in each shape group.

As shown in FIG. 19, after the CPU 210 detects the feature points of the faces in the step S1610, in step S1910, the CPU 210 determines face poses of the faces in the labeled face regions based on the detected feature points.

In step S1920, the CPU 210 groups the face poses of the faces in the labeled face regions based on pre-defined angle intervals for the rotation angles of the faces relative to 3D directions, and regarding the grouping results as the pre-defined pose groups.

In step S1930, as for each pre-defined pose group, the CPU 210 determines face shapes of the faces in the labeled face region based on the detected feature points of the faces whose face pose in the labeled face regions are grouped into this pre-defined pose group.

In step S1940, as for each pre-defined pose group, the CPU 210 clusters the corresponding face shapes of the faces in the labeled face regions and regarding the clustered results with the centers as the pre-defined shape groups in this pre-defined pose group.

And then, in step S1950, as for each pre-defined shape group in each pre-defined pose group, the CPU 210 generates the corresponding pre-generated third models based on the corresponding 3D sample images, wherein, the face poses of the faces in the labeled face regions of these 3D sample images belong to this pre-defined pose group and the face shapes of the faces in the labeled face regions of these 3D sample images belong to this pre-defined shape group. Wherein, each pre-generated third model includes at least one classifier with a labeled region (i.e. the above-mentioned "salient region"), and the classifiers are generated based on features extracted from the corresponding labeled region among the corresponding 3D sample images.

Since the step S1610 shown in FIG. 19 is the same as the step S1610 shown in FIG. 16, the processing of the steps S1910-S1920 shown in FIG. 19 are the same as the processing of the steps S1810-S1820 shown in FIG. 18, and the processing of the steps S1930-S1950 are the same as the processing of the steps S1620-S1640 shown in FIG. 16, the detailed description would not be repeated herein.

(Image Processing Apparatus or System)

Figure 20:
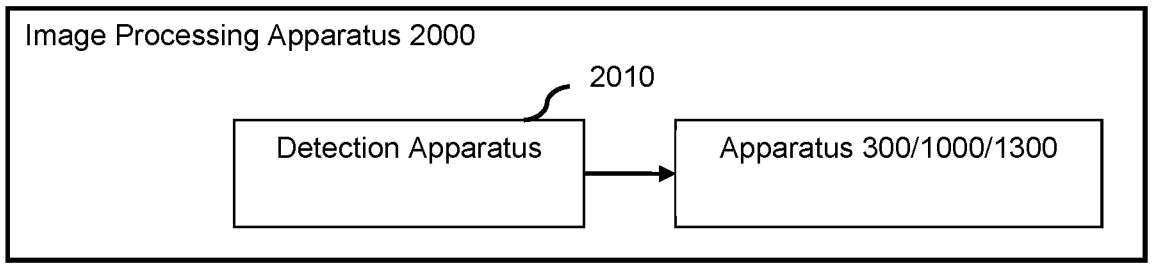
FIG. 20 illustrates the arrangement of an exemplary image processing apparatus according to the present disclosure.

In the above-mentioned embodiments, the image acquired by the Input Device 250 shown in FIG. 2 is an image with a face region. That is to say, in the above-mentioned embodiments, it is assumed that the face region has been detected from the image. However, generally, the image output from the electronic device (such as the image acquiring apparatus) or input by the user is an image in which the face region has not been detected yet. Therefore, as an exemplary application of the above-mentioned facial expression recognition, an exemplary image processing apparatus will be described next with reference to FIG. 20. FIG. 20 illustrates the arrangement of an exemplary image processing apparatus 2000 according to the present disclosure.

As shown in FIG. 20, the image processing apparatus 2000 according to the present disclosure comprises a detection apparatus 2010 and the above-mentioned apparatus 300 shown in FIG. 3 or the above-mentioned apparatus 1000 shown in FIG. 10 or the above-mentioned apparatus 1300 shown in FIG. 13. In one instance, the detection apparatus 2010 and the apparatus 300/1000/1300 could be connected with each other via a system bus (not shown). In another instance, the detection apparatus 2010 and the apparatus 300/1000/1300 could be connected with each other via a network (not shown).

First, the detection apparatus 2010 receives an image output from the electronic device (such as the image acquiring apparatus) or input by the user. And then the detection apparatus 2010 detects at least one face region from the received image by using the pre-generated face detectors for example. And the pre-generated face detectors could be stored in the storage device 350 shown in FIG. 3, the storage device 1030 shown in FIG. 10 or the storage device 1320 shown in FIG. 13. The detected face region includes four points (i.e. the left-top point, the left-bottom point, the right-top point and the right-bottom point) that could represent the face position on the received image for example.

And then, the apparatus 300/1000/1300 recognizes expressions of the faces in the detected face regions according to the above-mentioned description with reference of FIG. 3 to FIG. 15.

In addition, as an exemplary application of the above-mentioned image processing apparatus 2000, an exemplary image processing system will be described next with reference to FIG. 21. FIG. 21 illustrates the arrangement of an exemplary image processing system 2100 according to the present disclosure.

As shown in FIG. 21, the image processing system 2100 according to the present disclosure comprises an image acquiring apparatus 2110 and the above-mentioned image processing apparatus 2000, wherein, the image acquiring apparatus 2110 and the image processing apparatus 2000 are connected with each other via a network 2120. Alternatively, the image acquiring apparatus 2110 and the image processing apparatus 2000 also could be connected with each other via a system bus (not shown). In addition, the image processing apparatus 2000 comprises a detection apparatus 2010 and the above-mentioned apparatus 300/1000/1300.

First, the image acquiring apparatus 2110 acquires at least one image of a person for example. For example, the image acquiring apparatus 2110 is a 3D image acquiring device.

And then, the image processing apparatus 2000 acquires the images from the image acquiring apparatus 2110 through the network 2120. And the image processing apparatus 2000 detects the face regions from the acquired images and recognizes expressions of the faces in the detected face regions according to the above-mentioned description with reference to FIG. 20.

Taking a 3D clothing store which applies the above-mentioned image processing system 2100 for example, in case a customer is trying on various clothes, during the try-on activities, the image acquiring apparatus 2110 will acquire the corresponding 3D images of this customer, and the image processing apparatus 2000 will recognize this customer's expressions. Thus, based on the recognized expressions for various customers, the 3D clothing store could analyse that which kind of clothes are most popular for example, which is useful for the 3D clothing store to make the corresponding sales decision.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

It is possible to carry out the apparatus and method of the present disclosure in many ways. For example, it is possible to carry out the method and apparatus of the present disclosure through software, hardware, firmware or any combination thereof. The above described order of the steps for the method is only intended to be illustrative, and the steps of the method of the present disclosure are not limited to the above specifically described order unless otherwise specifically stated. Besides, in some embodiments, the present disclosure may also be embodied as programs recorded in recording medium, including machine-readable instructions for implementing the method according to the present disclosure. Thus, the present disclosure also covers the recording medium which stores the program for implementing the method according to the present disclosure.

Although some specific embodiments of the present disclosure have been demonstrated in detail with examples, it should be understood by a person skilled in the art that the above examples are only intended to be illustrative but not to limit the scope of the present disclosure. It should be understood by a person skilled in the art that the above embodiments can be modified without departing from the scope and spirit of the present disclosure. The scope of the present disclosure is defined by the attached claims.

What is claimed is:

1. An apparatus for recognizing expression of a face in a face region of an input image, comprising:
   one or more processors; and
   one or more memories coupled to the one or more processors, the memories stored thereon instructions which, when executed by the one or more processors, cause the apparatus to:
   detect local features of the face in the face region of the input image;
   determine a face shape of the face based on the detected local features;
   determine a face pose of the face in the face region based on the detected local features;
   determine a group that the face belongs to based on the determined face shape, the determined face pose, pre-defined shape groups and pre-defined pose groups among the pre-defined shape groups, wherein the pre-defined pose groups correspond to angle ranges of rotation angles of faces relative to coordinates; and
   determine an expression of the face in the face region based on at least one pre-generated model corresponding to the determined group and features extracted from at least one region in the face region, wherein the at least one region is a region which is prescribed in the pre-generated model corresponding to the determined group,
   wherein the pre-generated model is generated by the following steps:
   determining, as for each pre-defined shape group, face poses of faces in a plurality of sample images based on detected local features of the faces whose face shapes are clustered into the each pre-defined shape group;
   grouping, as for each pre-defined shape group, the face poses of the faces based on pre-defined angle intervals for the rotation angles of the faces relative to the coordinates, and regarding the grouping results as the pre-defined pose groups in the each pre-defined shape group; and
   generating, as for each pre-defined pose group in each pre-defined shape group, the corresponding pre-generated model based on the corresponding sample images, in which the face shapes of the faces belong to the each pre-defined shape group and the face poses of the faces belong to the each pre-defined pose group.

2. The apparatus according to claim 1, wherein
   one of the pre-defined shape groups is selected as the determined group based on distances among the determined face shape and centers of the pre-defined shape groups.

3. The apparatus according to claim 2, wherein the pre-generated model is generated further by the following steps:
   detecting local features of faces in face regions in a plurality of sample images;
   determining face shapes of the faces based on the detected local features; and
   clustering the face shapes of the faces and regarding the clustered results with the centers as the pre-defined shape groups.

4. The apparatus according to claim 1, wherein the group is determined by
   determining one of the pre-defined shape groups based on distances among the determined face shape and centers of the pre-defined shape groups; and
   selecting one of the pre-defined pose groups in the determined pre-defined shape group as the determined group by comparing the determined face pose with angle ranges of the pre-defined pose groups in the determined pre-defined shape group.

5. The apparatus according to claim 3, wherein at least one of the classifiers in the pre-generated model is generated by the following steps:
   weighting the corresponding sample images;
   obtaining at least one candidate region from each weighted sample image;
   as for the candidate regions with the same position among the weighted sample images, generating a candidate classifier with a classification error based on features extracted from these candidate regions; and
   selecting the candidate classifier with the minimum classification error as the corresponding classifier;
   wherein, a region whose position corresponds to the position of the candidate regions used to generate this classifier is regarded as the labeled region of this classifier.

6. The apparatus according to claim 1, wherein, as for a 3-dimensional image, the extracted local features are depth features of the face in the input image.

7. The apparatus according to claim 1, wherein, as for a 3-dimensional image, the extracted local features are depth features and color features of the face in the input image.

8. An image processing apparatus, comprising:
   a detection apparatus configured to detect at least one face region from an input image;
   an apparatus according to claim 1, configured to recognize expressions of the faces in the detected face regions.

9. An image processing system, comprising:
   an image acquiring apparatus configured to acquire at least one image;

an image processing apparatus, comprising:
a detection apparatus configured to detect at least one face region from the acquired images;
an apparatus according to claim 1, configured to recognize expressions of the faces in the detected face regions.

10. An apparatus for recognizing expression of a face in a face region of an input image, comprising:
one or more processors; and
one or more memories coupled to the one or more processors, the memories stored thereon instructions which, when executed by the one or more processors, cause the apparatus to:
detect local features of the face in the face region of the input image;
determine a face shape of the face based on the detected local features;
determine a face pose of the face based on the detected local features;
determine a group that the face belongs to based on the determined face shape, the determined face pose, pre-defined pose groups and pre-defined shape groups among the pre-defined pose groups, wherein the pre-defined pose groups correspond to angle ranges of rotation angles of faces relative to coordinates; and
determine an expression of the face in the face region based on at least one pre-generated model corresponding to the determined group and features extracted from at least one region in the face region, wherein the at least one region is a region which is prescribed in the pre-generated model corresponding to the determined group,
wherein the pre-generated model is generated by the following steps:
grouping face poses of faces in a plurality of sample images based on pre-defined angle intervals for rotation angles of the faces relative to coordinates, and regarding the grouping results as the pre-defined pose groups;
determining, as for each pre-defined pose group, face shapes of the faces based on detected local features of the faces whose face pose are grouped into the each pre-defined pose group; and
generating, as for each pre-defined shape group in each pre-defined pose group, the corresponding pre-generated model based on the corresponding sample images, in which the face poses of the faces belong to the each pre-defined pose group and the face shapes of the faces belong to the each pre-defined shape group.

11. The apparatus according to claim 10, wherein
one of the pre-defined pose groups is determined by comparing the determined face pose with angle ranges of the pre-defined pose groups; and
one of the pre-defined shape groups in the determined pre-defined pose group is selected as the determined group based on distances among the determined face shape and centers of the pre-defined shape groups in the determined pre-defined pose group.

12. The apparatus according to claim 11, wherein the pre-generated model is generated further by the following steps:
detecting local features of faces in face regions in a plurality of sample images;
determining face poses of the faces based on the detected local features; and
clustering, as for each pre-defined pose group, the face shapes of the faces and regarding the clustered results with the centers as the pre-defined shape groups in the each pre-defined pose group;
wherein, each pre-generated model includes at least one classifier with a labeled region, and the classifiers are generated based on features extracted from the corresponding labeled regions among the corresponding sample images.

13. The apparatus according to claim 11, wherein, as for a 3-dimensional image, the extracted local features are depth features of the face in the input image.

14. The apparatus according to claim 11, wherein, as for a 3-dimensional image, the extracted local features are depth features and color features of the face in the input image.

15. A method for recognizing expression of a face in a face region of an input image, the method comprising:
detecting local features of the face in the face region of the input image;
determining a face shape of the face based on the detected local features;
determining a face pose of the face based on the detected local features;
determining a group that the face belongs to based on the determined face shape, the determined face pose, pre-defined shape groups and pre-defined pose groups among the pre-defined shape groups, wherein the pre-defined pose groups correspond to angle ranges of rotation angles of faces relative to coordinates; and
determining an expression of the face in the face region based on at least one pre-generated first model corresponding to the determined group and features extracted from at least one region in the face region, wherein the at least one region is a region which is prescribed in the pre-generated model corresponding to the determined group,
wherein the pre-generated model is generated by the following steps:
determining, as for each pre-defined shape group, face poses of faces in a plurality of sample images based on detected local features of the faces whose face shapes are clustered into the each pre-defined shape group;
grouping, as for each pre-defined shape group, the face poses of the faces based on pre-defined angle intervals for the rotation angles of the faces relative to the coordinates, and regarding the grouping results as the pre-defined pose groups in the each pre-defined shape group; and
generating, as for each pre-defined pose group in each pre-defined shape group, the corresponding pre-generated model based on the corresponding sample images, in which the face shapes of the faces belong to the each pre-defined shape group and the face poses of the faces belong to the each pre-defined pose group.

16. The method according to claim 15, wherein, as for a 3-dimensional image, the extracted local features are depth features and color features of the face in the input image.

17. A non-transitory computer readable storage medium storing a program, which causes a computer to execute the method according to claim 15.

18. A method for recognizing expression of a face in a face region of an input image, the method comprising:
detecting local features of the face in the face region of the input image;
determining a face shape of the face based on the detected local features;
determining a face pose of the face in the face region based on the detected local features;

determining a group that the face belongs to based on the determined face shape, the determined face pose, pre-defined pose groups and pre-defined shape groups among the pre-defined pose groups, wherein the pre-defined pose groups correspond to angle ranges of rotation angles of faces relative to coordinates; and determining an expression of the face in the face region based on at least one pre-generated model corresponding to the determined group and features extracted from at least one region in the face region, wherein the at least one region is a region which is prescribed in the pre-generated model corresponding to the determined group, wherein the pre-generated model is generated by the following steps:

grouping face poses of faces in a plurality of sample images based on pre-defined angle intervals for rotation angles of the faces relative to coordinates, and regarding the grouping results as the pre-defined pose groups;

determining, as for each pre-defined pose group, face shapes of the faces based on detected local features of the faces whose face pose are grouped into the each pre-defined pose group; and generating, as for each pre-defined shape group in each pre-defined pose group, the corresponding pre-generated model based on the corresponding sample images, in which the face poses of the faces belong to the each pre-defined pose group and the face shapes of the faces belong to the each pre-defined shape group.

19. The method according to claim 18, wherein, as for a 3-dimensional image, the extracted local features are depth features and color features of the face in the input image.

20. A non-transitory computer readable storage medium storing a program, which causes a computer to execute the method according to claim 18.

* * * * *